United States Patent
Take

(10) Patent No.: US 6,442,553 B1
(45) Date of Patent: *Aug. 27, 2002

(54) HASH SYSTEM AND HASH METHOD FOR TRANSFORMING RECORDS TO BE HASHED

(75) Inventor: Riichiro Take, Kawasaki (JP)

(73) Assignee: Fujitsu Limited, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/519,933

(22) Filed: Aug. 28, 1995

(30) Foreign Application Priority Data

Oct. 31, 1994 (JP) .............................. 6-266874

(51) Int. Cl.$^7$ .............................................. G06F 17/30
(52) U.S. Cl. ...................................... 707/100; 395/709
(58) Field of Search ............................ 395/421.06, 601, 395/410, 611, 709; 707/1, 7, 206, 12, 100

(56) References Cited

U.S. PATENT DOCUMENTS

| | | | | |
|---|---|---|---|---|
| 4,215,402 A | * | 7/1980 | Mitchell et al. | 364/200 |
| 4,680,700 A | * | 7/1987 | Hester et al. | 364/200 |
| 4,780,816 A | * | 10/1988 | Connell | 364/200 |
| 5,287,499 A | * | 2/1994 | Nemes | 395/600 |
| 5,339,398 A | * | 8/1994 | Shah et al. | 395/400 |
| 5,420,982 A | * | 5/1995 | Take | 712/12 |
| 5,621,908 A | * | 4/1997 | Akaboshi et al. | 707/7 |
| 5,640,554 A | * | 6/1997 | Take | 707/7 |
| 5,680,622 A | * | 10/1997 | Even | 395/709 |
| 5,687,361 A | * | 11/1997 | Sarkar | 707/1 |
| 5,893,120 A | * | 4/1999 | Nemes | 707/206 |
| 6,052,697 A | * | 4/2000 | Bennett et al. | 707/205 |
| 6,067,547 A | * | 5/2000 | Douceur | 707/100 |
| 6,226,634 B1 | * | 5/2001 | Ogihara et al. | 707/4 |

FOREIGN PATENT DOCUMENTS

| | | | |
|---|---|---|---|
| EP | 0 411 691 A2 | * 2/1991 | |
| GB | 2294564 A | * 1/1996 | ........... G06F/12/02 |
| JP | 61-13340 | 1/1986 | |
| JP | 4-243442 | 8/1992 | |
| JP | 6-103127 | 4/1994 | |

* cited by examiner

*Primary Examiner*—Thomas Black
*Assistant Examiner*—Charles L. Rones
(74) *Attorney, Agent, or Firm*—Staas & Halsey LLP

(57) ABSTRACT

A method transforms a group of records to be hashed stored in a storage unit into a referenceable storage form using hash function values, which respectively correspond to key values of the records. The method includes steps of; temporarily storing the records in a record storing unit; storing pointers, each of which indicates a storing position of a record stored in the record storing unit, in pointer storing unit in association with a hash function value obtained by a calculation based on a key value of the record; and outputting the record indicated by a pointer, which is stored in the pointer storing unit and corresponding to a designated hash function value, from the record storing unit to the storage unit.

21 Claims, 28 Drawing Sheets

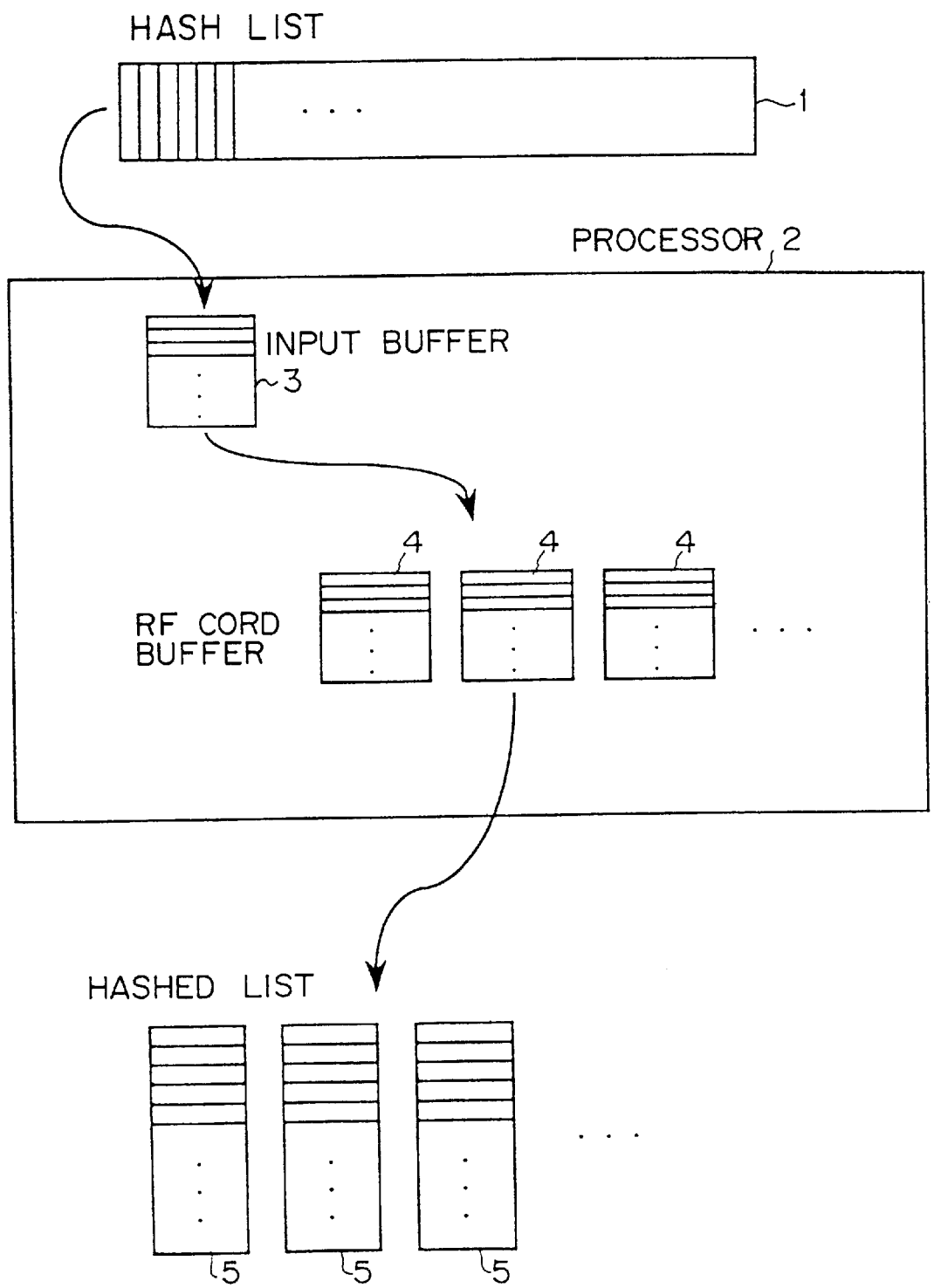
F I G. 1

AN EXAMPLE OF A RECORD STRING 1, 74, 52, 40, 64, 103, 48, 99, 149, 167,
105, 23, 133, 59, 56, 124, 169, 75, 146, 73,
174, 87, 155, 173, 27, 5, 104, 152, 84, 63,
3, 121, 186, 93, 43, 134, 139, 171, 31, 115

FIG. 13

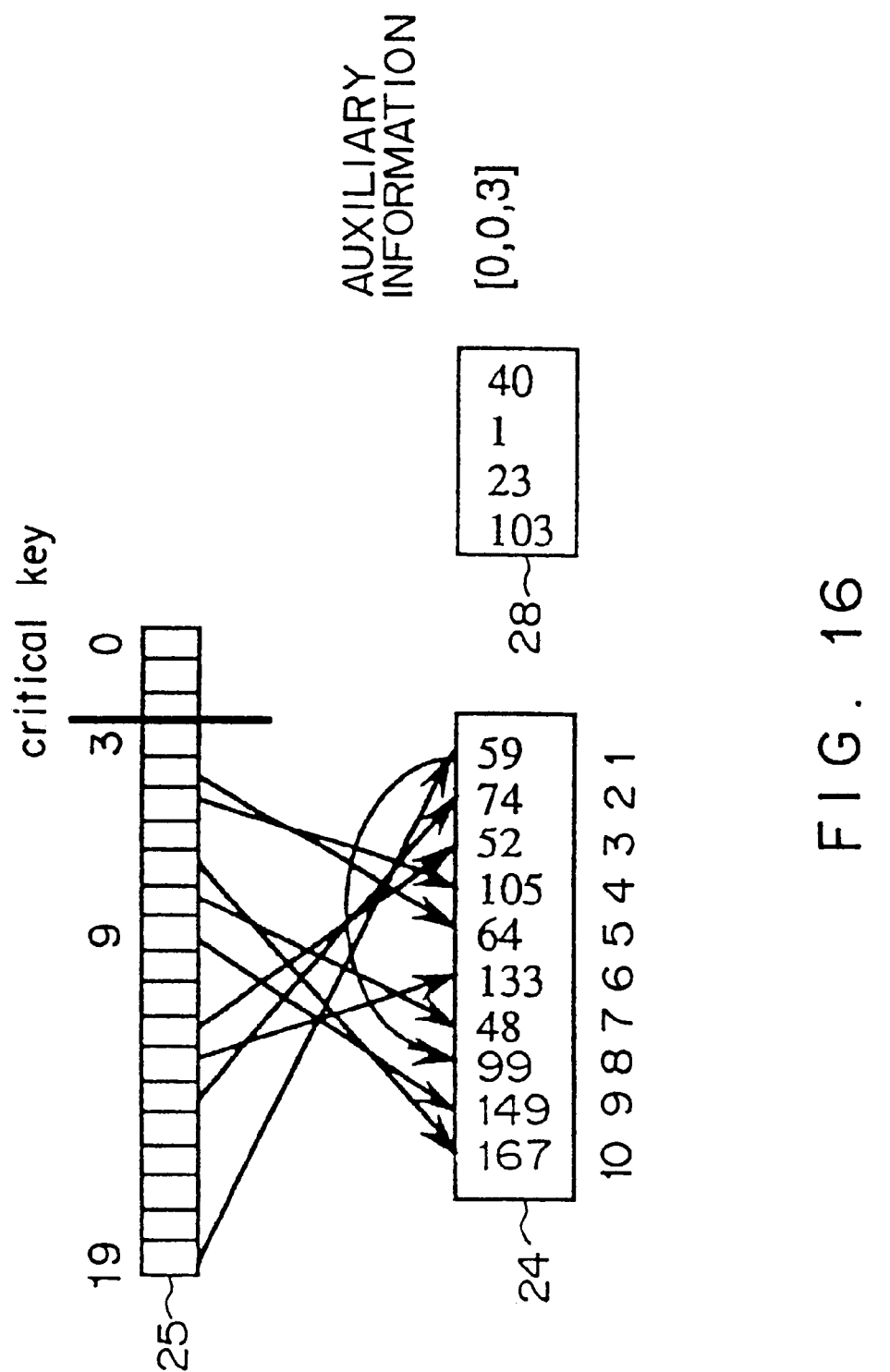
F I G. 16

AUXILIARY INFORMATION PREPARED
IN THE HASH PROCESS

0     [0,0,3]
1     [1,4,8]
2     [2,9,13]
3     [3,13,15]
4     [4,15,19]
5     [5,3,4]
6     [6,4,6]
7     [7,7,11]
8     [8,12,14]
9     [9,15,19]
10     [10,1,3]

CORRESPONDING
BLOCK NUMBER

FIG. 20

HASH SYSTEM AND HASH METHOD FOR TRANSFORMING RECORDS TO BE HASHED

BACKGROUND OF THE INVENTION

1. Field of the Invention

The present invention relates to a system and a method for hashing data, and more particularly, to a system and a method for transforming a group of records to be hashed stored in a secondary storage into a referenceable storage form using hash function values, each of which corresponds to a key value of the record.

2. Description of the Related Art

A hash process, in which a group of records stored in a secondary storage, such as a disc storage unit, are transformed into a referenceable storage form using hash function values, each of which corresponds to the key values of the record, is widely used in a conventional data processing system.

FIG. 1 shows a conventional hash process and FIG. 2 shows a flow chart of the conventional hash process.

In the conventional hash process, a hash list 1 of a group of records to be hashed stored in, for example, a disc storage unit of a computer system, is read into an input buffer 3 in a processor 2, and hash function values, which respectively correspond to key values of the records to be hashed, are calculated according to a hash function as shown in FIG. 1. Then, each of the records in the input buffer 3 is stored in one of record buffers 4 according to the hash function values of the record. If a record buffer 4, which corresponds to one of the hash function values, is filled with records, the records in the record buffer are output into a storage region of a hashed list 5 of a group of hash lists which respectively correspond to the record buffers 4.

As shown in FIG. 2, after starting the hash process, a group of records is read into the input buffer 3 from the hash list 1 (step S1). Next, one record is output from the input buffer 3 (step S2), the hash function value of the record is calculated based on the key value of the record using a hash function (step S3), and the record is stored in one of the record buffers 4 which corresponds to the hash function value of the record (step S4).

After that, whether or not the record buffer 4 is full is determined (step S5), and then all of the records stored in the record buffer 4 are output to the corresponding one of the hashed lists 5 in the disc storage unit (step S6) if the record buffer 4 is full (YES, in step S5), and the process goes to step S7. If the record buffer 4 is not full (NO, in step S5), the process directly goes to step S7, and whether or not there is a record left in the input buffer 3 is determined (step S7).

If there is a record left in the input buffer (YES, in step S7), the process goes back to step S2. If there is no record left in the input buffer (NO, step S7), whether or not there is a record to be hashed left in the hash list 1 is determined (step S8). If there is a record to be hashed in the hashed list 1 (YES, in step S8), the record or a group of records to be hashed is read into the input buffer 3 from the hash list 1 (step S9), and then the process goes back to step S2.

If there is no record left in the hash list 1 (NO, step S8), all of the records left in each of the record buffers 4 are output to the corresponding hashed list 5 (step 10) and the process is completed.

In the process described above, each of the output processes, in which all of the records in a record buffer 4 are output to the corresponding hash lists 5, is performed individually, and the records stored in one of the record buffers 4 are sequentially read into the corresponding one of the hashed lists 5. Therefore, in each of the hashed list 5, each record is stored in a region next to a region in which the previous record is stored.

However, from the viewpoint of a memory region of the disc storage unit in which all of the hashed lists 5 are included, the record reading processes are not sequentially performed, and the records output from each of the record buffers 4 are discontinuously stored in the memory region. Therefore, according to the conventional hash process, many empty regions are formed in the memory region of the disc storage unit, and this reduces the available storage capacity of the disc storage unit and the operating performance of the computer system.

SUMMARY OF THE INVENTION

The objects of this invention are, therefore, to provide a method and a system in which the performance of the secondary storage is improved and the hash process is performed at high speed by reading and outputting the records to be hashed in larger blocks.

The hash method of this invention is for transforming a group of records to be hashed stored in a storage unit into a referenceable storage form using hash function values, which respectively correspond to key values of the records. The hash method includes steps of; temporarily storing the records in a record storing unit; storing pointers, each of which indicates a storing position of a record stored in the record storing unit, in a pointer storing unit in association with a hash function value obtained by a calculation based on a key value of the record; and outputting the record indicated by a pointer, which is stored in the pointer storing unit and corresponding to a designated hash function value, from the record storing unit to the storage unit.

The hash system of this invention is for transforming a group of records to be hashed stored in a storage unit into a referenceable storage form using hash function values, which respectively correspond to key values of the records. The hash system comprises; record storing unit for temporarily storing the group of the records; a pointer storing unit for storing pointers, each of which indicates a storing position of a record stored in the record storing unit, in association with a hash function value obtained by a calculation based on a key value of the record; and an output unit for receiving the record indicated by a pointer, which is stored in the pointer storing unit and corresponding to a designated hash function value, from the record storing unit, and outputting the record to the storage unit.

Records stored in the record storing unit and having the same function value may be linked to each other, and the pointer storing unit may store one of pointers indicating storing positions of the records.

The record storing unit may output records into the storage unit in a block form.

Auxiliary information used for retrieving records in the block by the hash function value may be stored in an auxiliary information storing unit.

The records in the block may be sequentially stored in a hashed list in the storage unit, and the auxiliary information may be stored in an auxiliary information list in the storage unit.

The auxiliary information may include, an address of the block in the hashed list, and the maximum value and the minimum value of the hash function values corresponding to the records in the block.

The hash function value corresponding to the record output from the record storing unit may be designated by an output hash value storage unit.

A record output from the storage unit may be temporarily stored in an input record storing unit and then output to the record storing unit.

The input record storing unit may output a record to an available region resulting from an output of a record from the record storing unit.

If record storing regions of the record storing unit are all empty, all of the records stored in the input record storing unit may be output to the record storing unit.

If record storing regions of the record storing unit are filled with records, the record storing unit may sequentially output records to the output.

BRIEF DESCRIPTION OF THE DRAWINGS

FIG. 1 shows a conventional hash process;

FIG. 13 shows a string of records to be hashed used in the hash process according to the embodiment;

FIG. 16 shows a state in which other three records have been moved to the output buffer;

FIG. 20 shows auxiliary information prepared in the hash process according to the embodiment;

DESCRIPTION OF THE PREFERRED EMBODIMENTS

Figure 2:
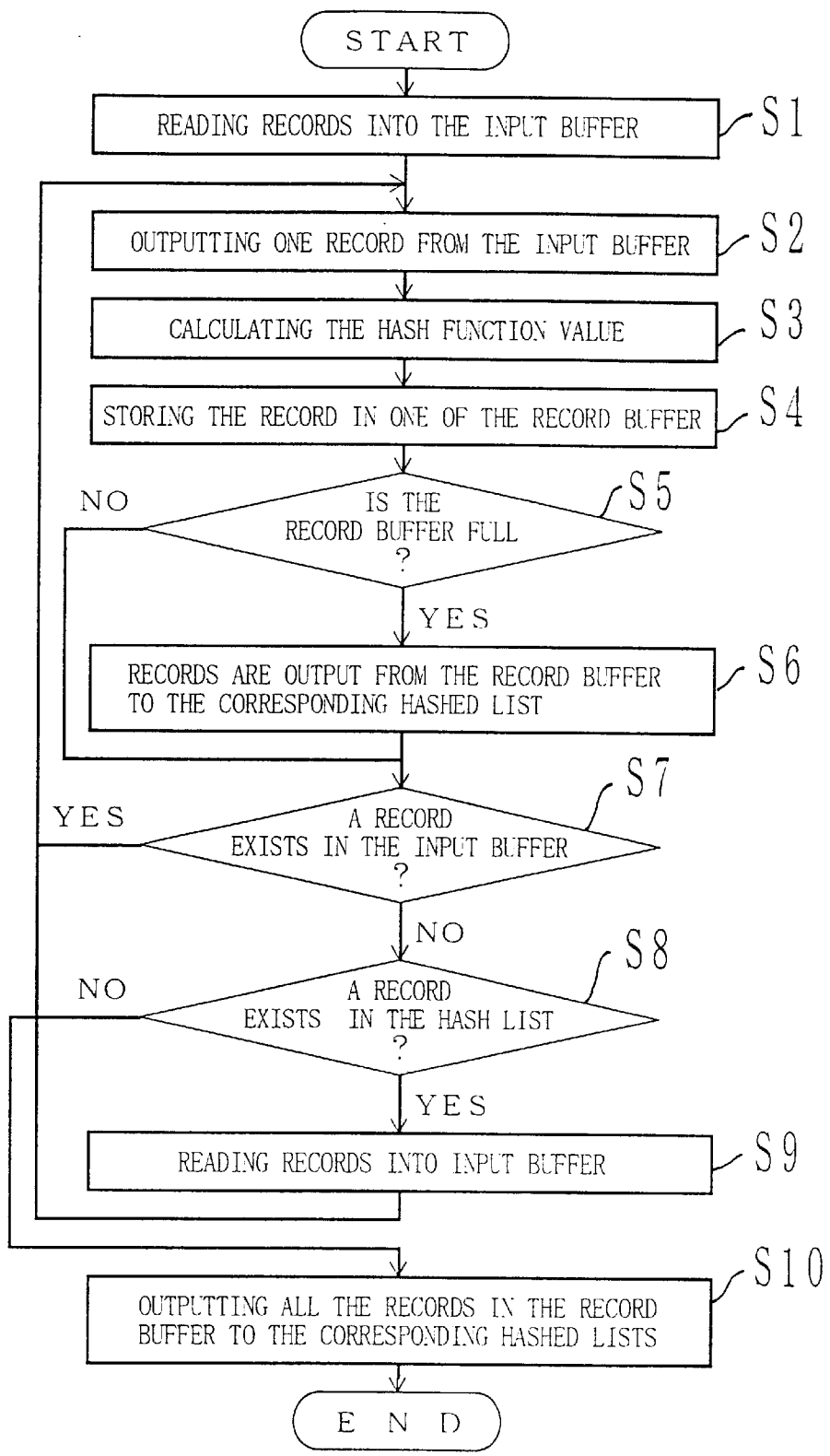
FIG. 2 is a flow chart showing the conventional hash process.
Figure 3:
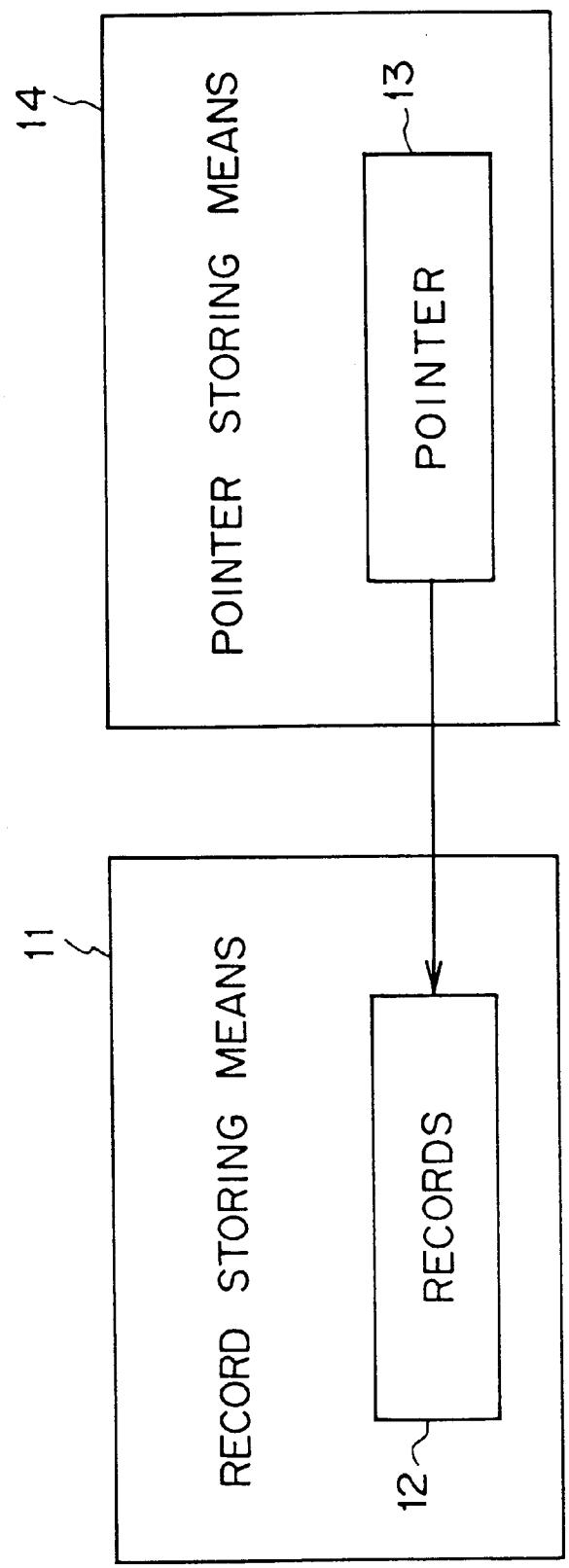
FIG. 3 shows a principle of a hash process according to this invention.

FIG. 3 shows a principle of a hash process according to this invention. In this hash process, a group of records to be hashed, which is stored in a storage unit, such as a disc device, is transformed into a referenceable storage form using hash function values respectively corresponding to key values of the records to be hashed.

As shown in FIG. 3, the record storing unit 11 temporarily stores records 12 to be hashed. For example, the record storing unit 11 may be a record buffer and may store ten records at a time. The conventional hash process requires a plurality of record buffers. In contrast, the hash process according to this invention requires only one record buffer. However, a plurality of record buffers can by used for the hash process according to this invention.

A pointer storing unit 14 stores pointers 13, which indicate storing positions of the records stored in the record storing unit 11, respectively. Storing positions of the pointers 13 in the pointer storing unit 14 correspond to hash function values calculated from key values of the records 12, respectively.

In the hash process according to this invention, a record stored in the record storing unit 11 is indicated by a pointer stored in the pointer storing unit, and then output to the storage unit through a hashed list output buffer, in association with the hash function value corresponding to the storing position of the pointer.

Figure 4:
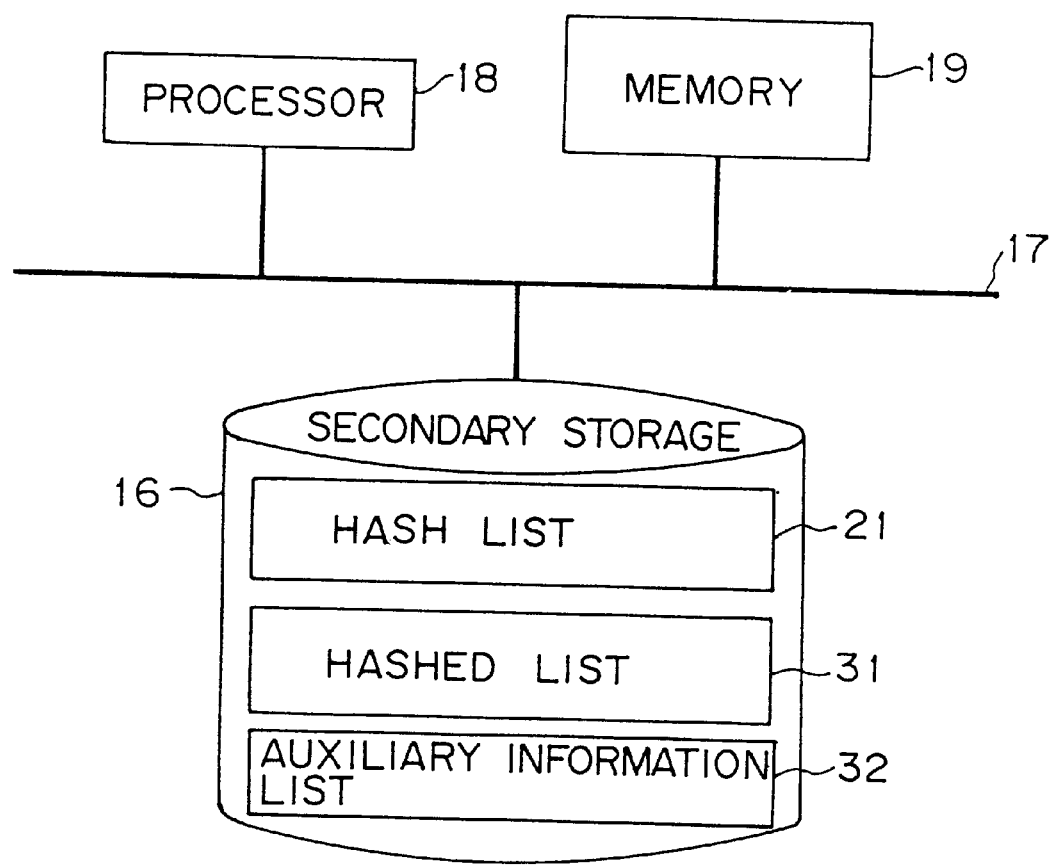
FIG. 4 shows a configuration of a computer system for implementing the hash process according to this invention.

FIG. 4 shows a configuration of a computer system for implementing the hash process according to this invention. As shown in FIG. 4, a secondary storage 16 storing records to be hashed is connected to a processor 18 and memory 19 via a common bus 17. The secondary storage 16 holds the records to be hashed as a hash list 21, the result of the hash process as a hashed list 31, and auxiliary information for the hashed list 31 as an auxiliary information list 32.

Figure 5:
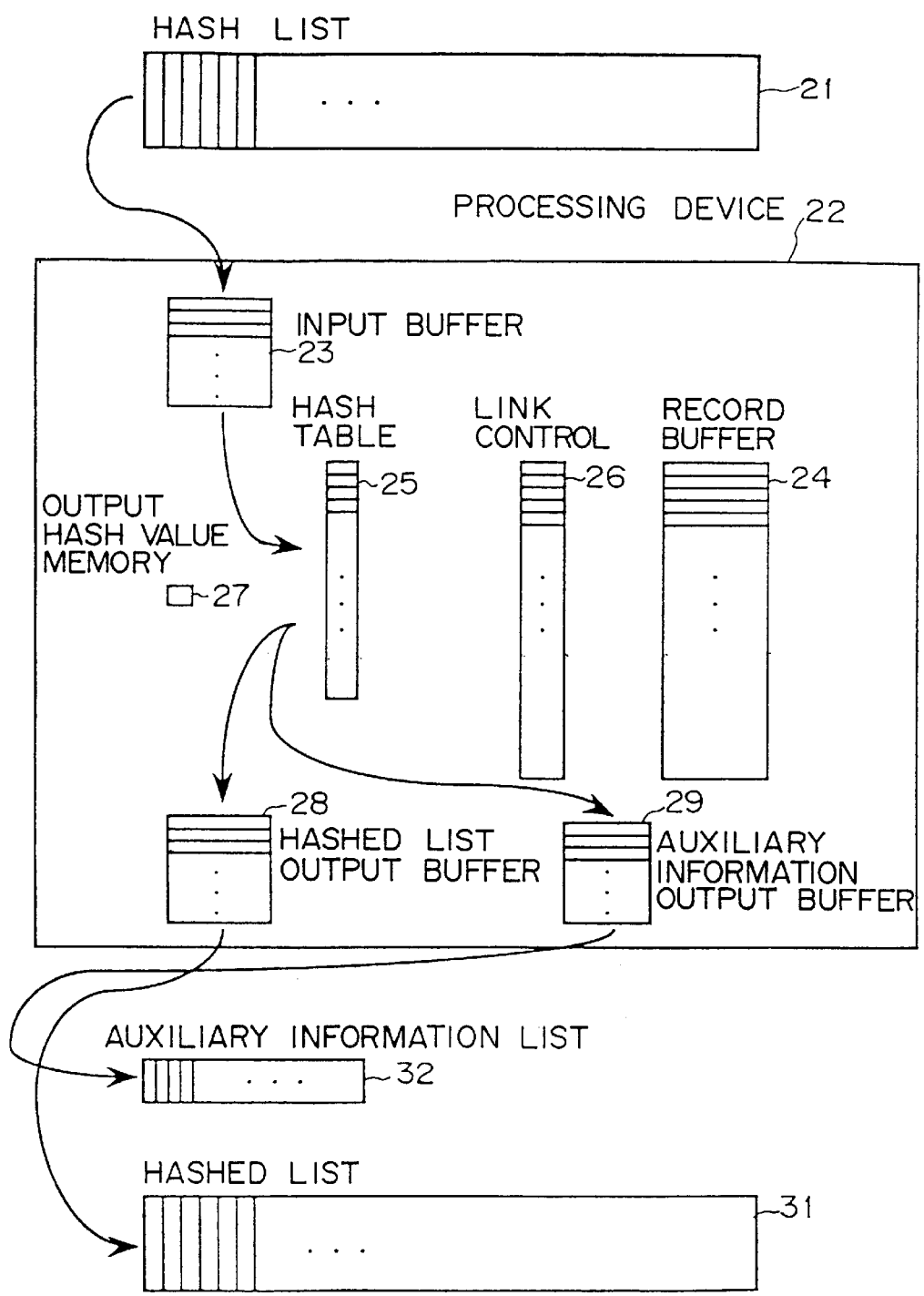
FIG. 5 shows a hash process according to the invention.

FIG. 5 shows the hash process according to this invention. A processing device 22 for performing the hash process according to this invention comprises an input buffer 23, a record buffer 24, a hash table 25, a link control table 26, an output hash value memory 27, a hashed list output buffer 28, and an auxiliary information output buffer 29, as shown in FIG. 5.

The records to be hashed in the hash list 21 are read into the input buffer 23, and then stored in the record buffer 24. Pointers each indicating the storing position of the record in the record buffer 24 are stored in the hash table 25 in association with a hash function value obtained by a calculation of the key value of the corresponding record. The link control table 26 is for controlling a link between records in the record buffer 24 having the same hash function value. The detail of the link control table 26 will be described later.

If the record buffer 24 becomes full, a record in the record buffer 24 is indicated by one of the pointers stored in the hash table 25 and is output to the hashed list output buffer 28. The pointer used in the output of the record is designated by a output hash value which is determined from the output hash value memory 27. Every time a record is output to the hashed list output buffer 28 from the record buffer 24, another record stored in the input buffer 23 is read into the record buffer 24 from the input buffer 23.

After the record is output to the hashed list output buffer 28, another record in the record buffer 24 is indicated by a pointer designated by the next output hash value in the output hash value memory 27 and is stored in the hashed list output buffer 28.

When the hashed list output buffer 28 becomes full, all of the records stored in the output buffer 28 are output to the hashed list 31 in a block. Then, the start address of the block, which corresponds to a block number in the storing region of the secondary storage, and the maximum value and the minimum value of the hash function values corresponding to the records in the block, are stored in the auxiliary information output buffer 29 as an auxiliary information record. The contents of the auxiliary information output buffer 29 are output to the auxiliary information list 32.

FIG. 6A through FIG. 8B show functions of the link control table 26 in relation to the record buffer 24 and the hash table 25. As shown in these figures, the link control table 26 and the record buffer 24 include the same number of entries. In this specification, "entry" means a storing portion and each entry stores one record or one pointer. If the record buffer 24 includes ten (10) entries and can store ten records, for example, the link control table 26 also has ten (10) entries and can store ten pointers. All entries of the record buffer 24 correspond to entries of the link control table 26 in a one-to-one relationship, accordingly the i-th entry of the record buffer 24 corresponds to the i-th entry of the link control table 26.

Figures 6A, 6B:
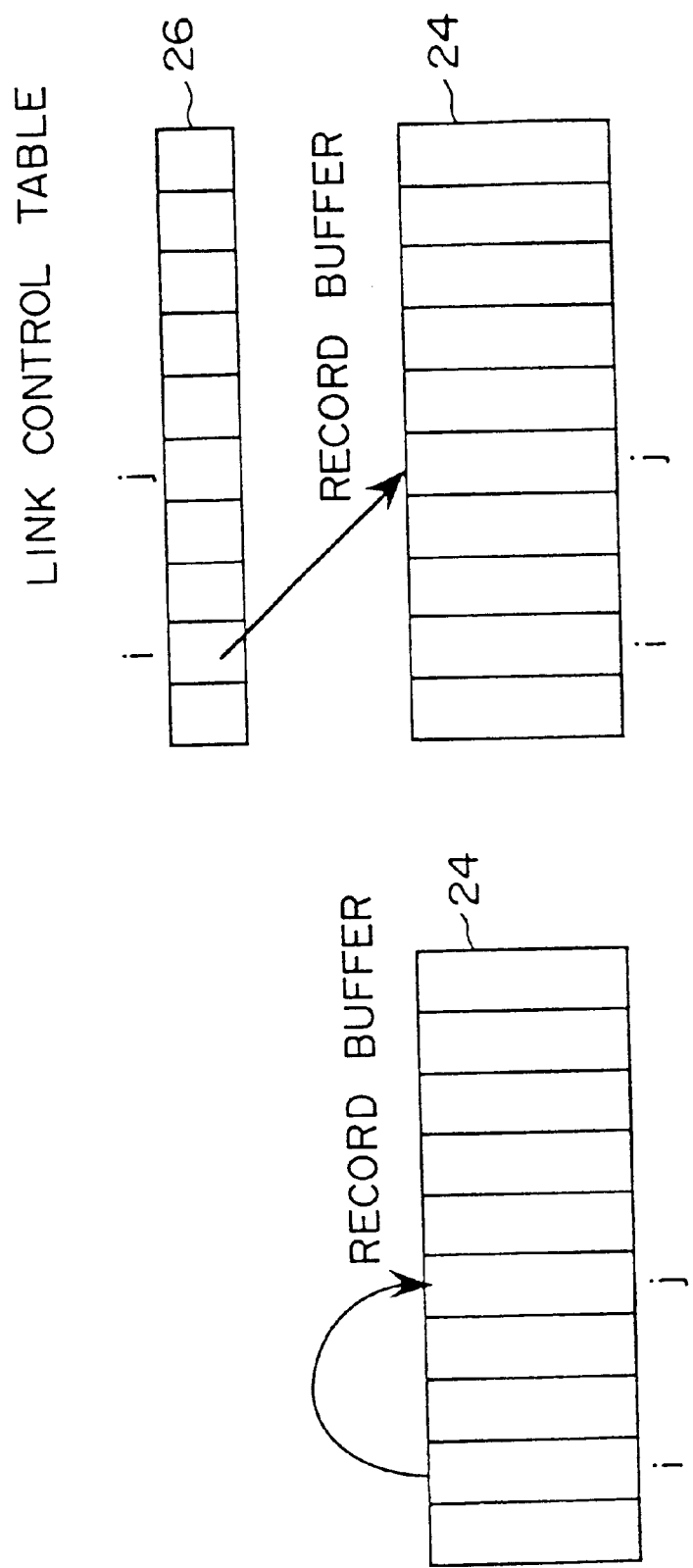
FIG. 6A and FIG. 6B show functions of a link control table and a record buffer of the embodiment according to this invention.

FIG. 6A shows two records to be linked together stored in the i-th entry and the j-th entry of the record buffer 24. Storing the pointer indicating the j-th entry of the record buffer 24 in i-th entry of the link control table 26, the i-th record stored in the i-th entry of the record buffer 24 is linked to the j-th record stored in the j-th entry, as shown in FIG. 6B.

Figures 7A, 7B:
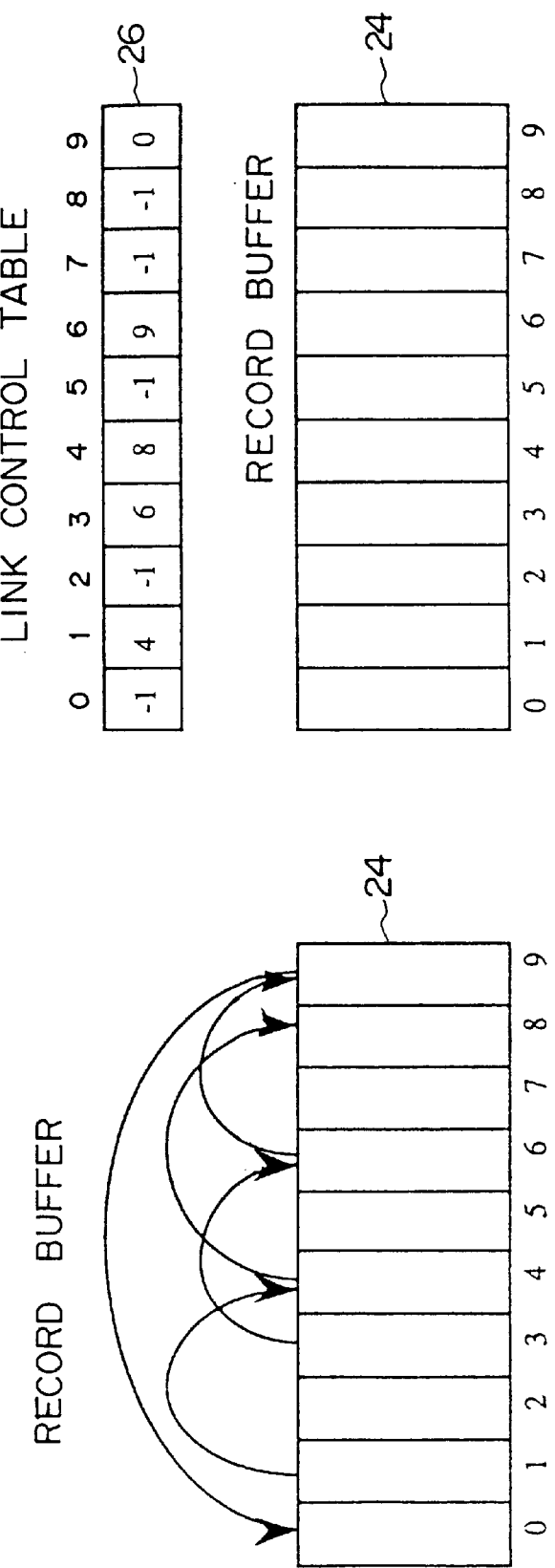
FIG. 7A and FIG. 7B also show functions of the link control table and the record buffer of the embodiment.

FIG. 7A and FIG. 7B show a link state in which more than two records in the record buffer 24 are linked. The records stored in entry 1, entry 4, and entry 8 have the same hash function value. Therefore, entry 1 is linked to entry 4 and entry 4 is linked to entry 8, as shown in FIG. 7A. Entry 3 is linked to entry 6, entry 6 is linked entry 9, and entry 9 is linked to entry 0, because the records stored in these entries 0, 3, 6, and 9 have the same hash function value.

In order to control the link state shown in FIG. 7A, the pointer indicating record 4, which is stored in the entry 4 of the record buffer 24, is stored in entry 1 of the link control table 26, the pointer indicating record 8 is stored in entry 4 of the link control table 26, and "−1", which indicates that no pointer is stored, is stored in entry 8 of the link control table 26. Pointers indicating record 6, record 9, and record 0 are stored in entry 3, entry 6, and entry 9 of the link control table 26, respectively, and "−1" is stored in the other entries, as shown in FIG. 7B.

Figure 8B:
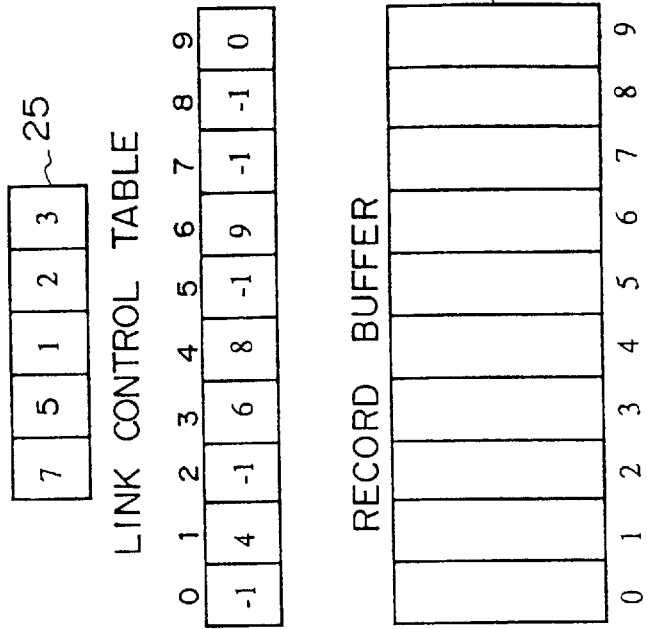
FIG. 8A and FIG. 8B show functions of the link control table, hash table, and the record buffer of the embodiment.
Figure 8A:
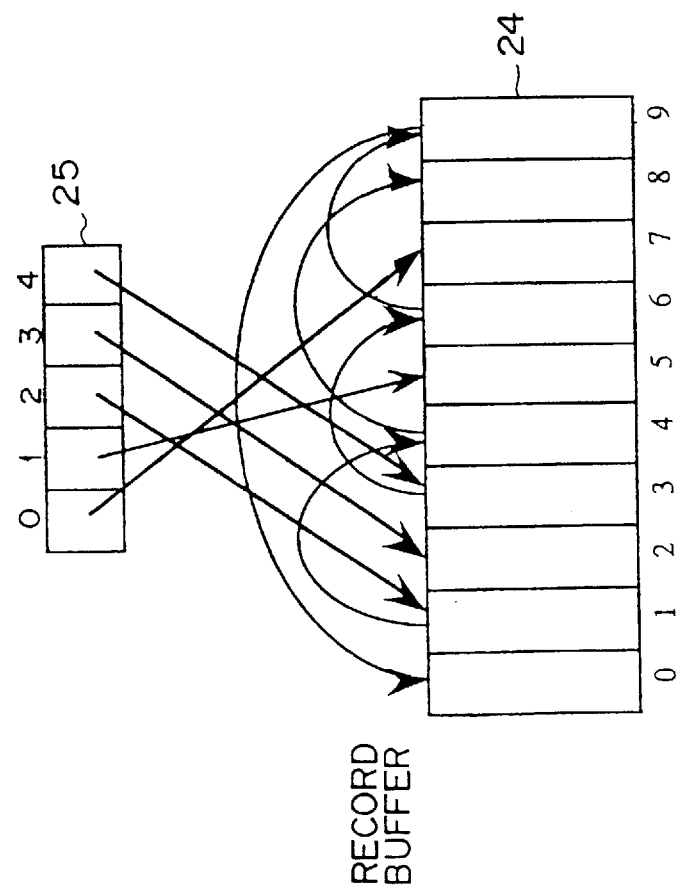

FIG. 8A and FIG. 8B show the link process between tables shown in FIG. 7A using the hash table 25. As described above, when more than two records corresponding to the same hash function value are stored in the record buffer 24, these records are linked to each other by the link control table 26. The pointer indicating the first record of the linked records is stored in the hash table 25. The pointer indicating the record not linked to other records is also stored in the hash table 25.

As shown in FIG. 8A, which shows the same link state as shown in FIG. 7A, pointers stored in entries 0 through 4 of the hash table 25 indicate records 7, 5, 1, 2, and 3 in the record buffer 24, respectively. Therefore, pointers of 7, 5, 1, 2, and 3 are stored in the hash table 25 in this order.

Each entry of the hash table 25 corresponds to one of the hash function values. When a hash function value is designated by a output hash value determined in the output hash value memory 27, a record indicated by the pointer in the corresponding entry of the hash table 25 is output from the record buffer 24. If a record linked to the output record is in the record buffer 24, then the record is indicated by a pointer in an entry of the link control table 26, corresponded to the entry of the record buffer 24 in which the record output was stored. Then, the record newly indicated is output from the record buffer 24 to the hashed list output buffer 28.

FIG. 9 through FIG. 12 show the hash process according to this invention.

Figure 9:
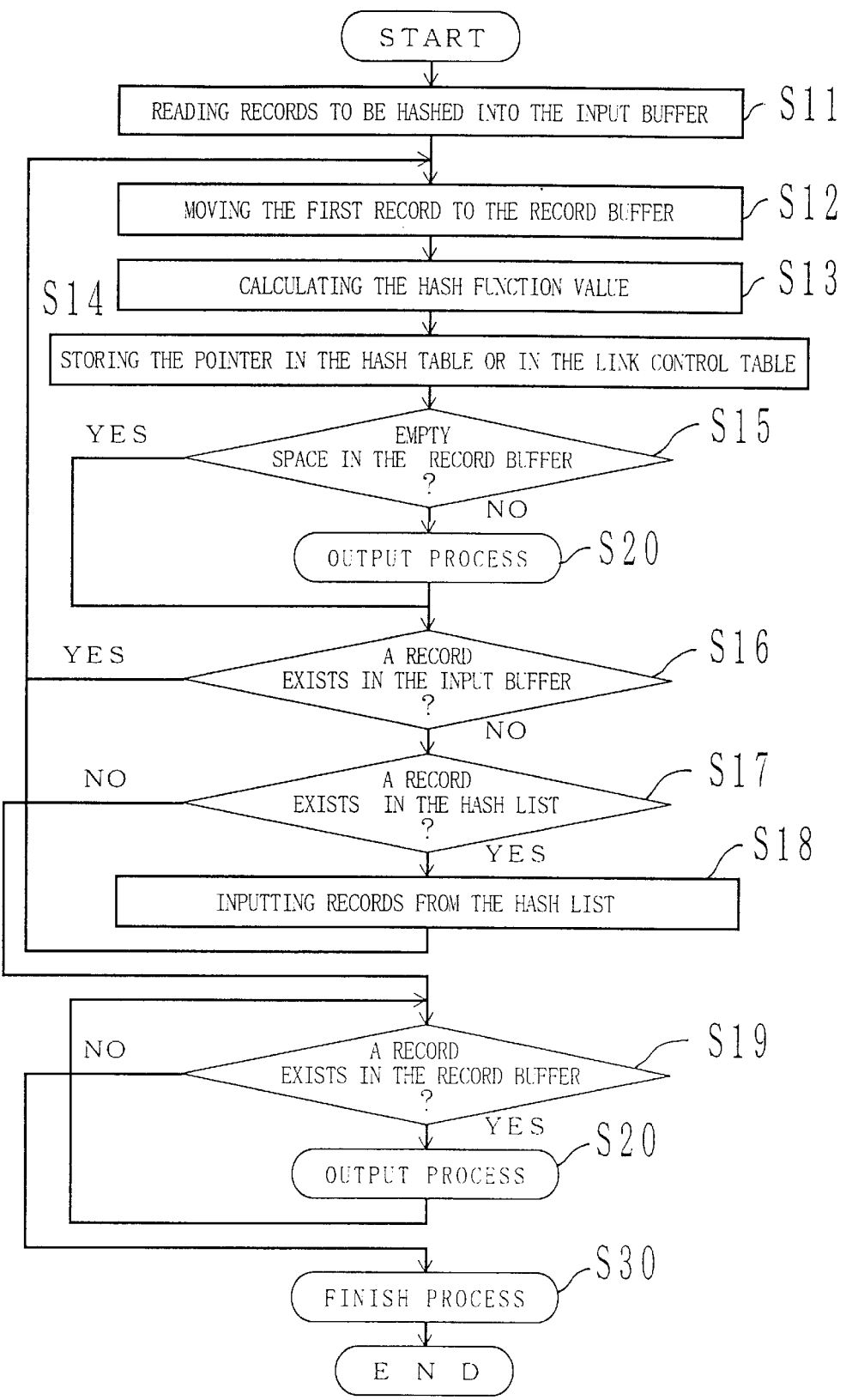
FIG. 9 is a flow chart showing the hash process according to the embodiment.

As shown in FIG. 9, after starting the hash process, the group of records to be hashed is read into the input buffer 23 from the hash list 21 (step S11). Next, the first record of the records in the input buffer 23 is moved to an empty space in the record buffer 24 (step S12) and the hash function value of the record is calculated based on the key value of the record (step S13). Then, the pointer of the record is stored in a entry of the hash table 25 which corresponds to the hash function value of the record (step S14). If a record having the same hash function value is already stored in the record buffer 24 and a pointer indicating the record is already stored in the hash table 25, the pointer indicating the newly entered record is stored in the entry of the hash table 25, and the pointer previously stored in the entry of the hash table 25 is moved into the entry of the link control table corresponding to the entry in which the newly entered record is stored, thereby realizing the link to the newly entered record from the record already stored.

Next, whether or not an empty space exists in the record buffer is determined (step S15). If an empty space exists (YES, in step S15), whether or not a record exists in the input buffer 23 is determined (step S16). If a record exists in the input buffer 23 (YES, in step S16), the process goes back to step S12.

When it is determined that there is no empty space in the record buffer (NO, in step S15), a record stored in the record buffer is output to the hashed list output buffer 28 (step S20), and then the process goes to step S16. The details of the output process of step 20 will be described later referring to FIG. 10.

If it is determined that there is no record in the input buffer 23 (NO, in step S16), whether or not a record to be hashed exists in the hash list 21 is determined (step S17). If a record exists in the hash list 21, after reading the record into the input buffer 23 from the hash list 21 (step S18), the process goes back to step S12.

When it is determined that there is no record to be hashed in the hash list 21 in step S17, whether or not a record exists in the record buffer 24 is determined (step S19). If a record exists in the record buffer 24 (YES, in step S19), after the output process of step S20, the process goes back to step S19. If no record exists in the record buffer 24 (NO, in step S19), after a finish process (step S30), which will be described later referring to FIG. 10, the hash process is completed.

Figure 10:
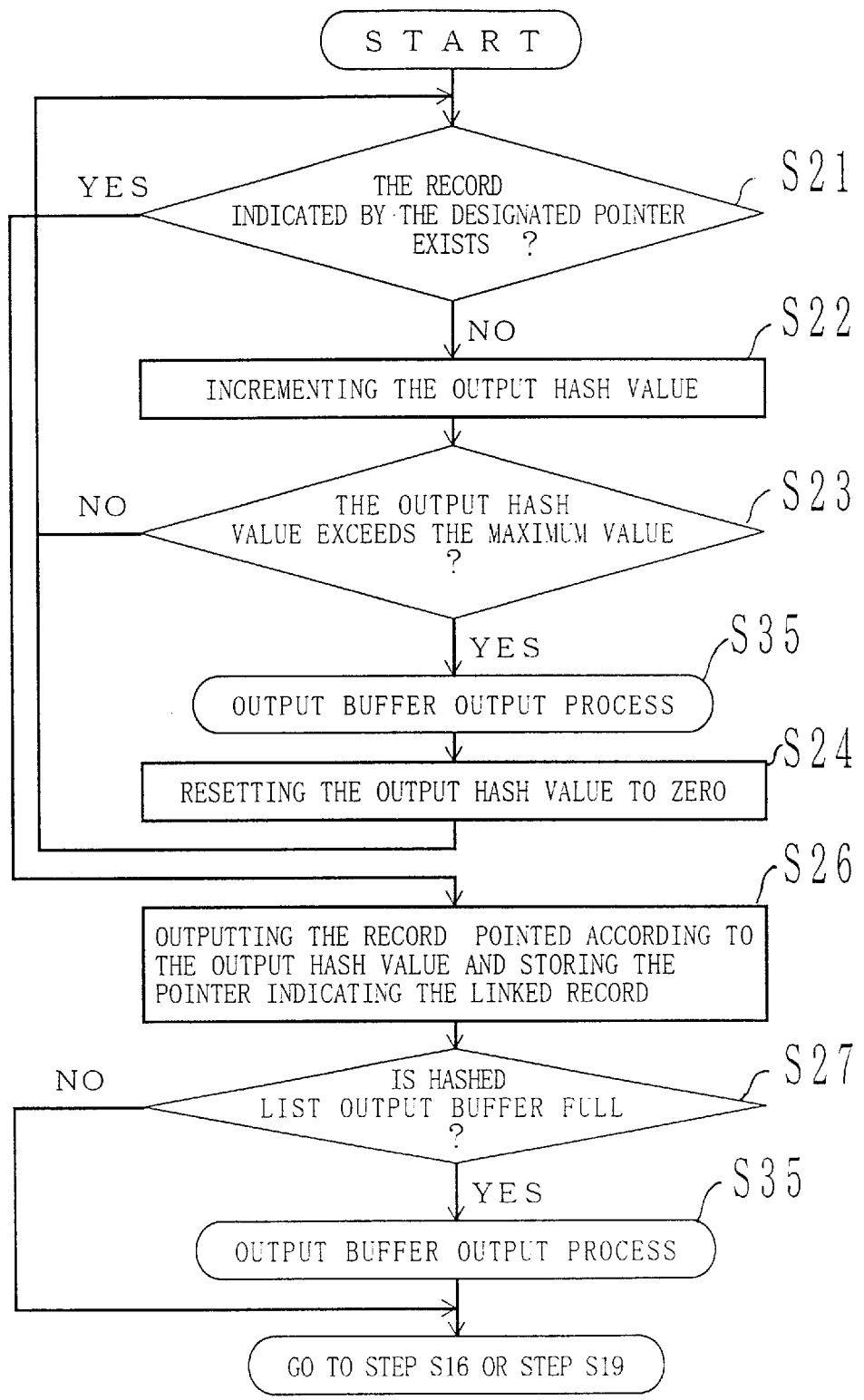
FIG. 10 is a flow chart showing an output process in the hash process according to the embodiment.

FIG. 10 shows the output process of step S20 in the above described hashed process. As shown in FIG. 10, after starting the output process, whether or not a record indicated by the pointer stored in the entry of the hash table 25 designated by the output hash value memory 27 exists in the record buffer 24 is determined (step S21). If there is no record indicated in the record buffer 24 (NO, in step S21), the output hash value in the output hash value memory is incremented. Then, whether or not the output hash value exceeds the maximum value of the hash function value is determined (step S23), and the process goes back to step S21 if the output hash value does not exceed the maximum value (NO, in step S23).

For example, when the hash function value is set to be the remainder from the division of the key value of the record by twenty (20), the maximum value is nineteen (19), and whether the output hash value exceeds nineteen is determined in step S23.

If the output hash value exceeds the maximum value of the hash function value (YES, in step S23), an output buffer output process, in which all of the records stored in the hashed list output buffer 28 are output to the hashed list 31 as a block (step S35), in order to maintain the order of the records in the block according to the hash function value, is performed. Then, the output hash value is reset to zero (step S24) and the process goes back to step S21. The output buffer output process of step S35 will be described in detail referring to FIG. 12.

If it is determined that the record indicated by the pointer which is in the entry designated by the output hash value, exists in the record buffer 24 in step S21 (YES, in step S21), the record is moved into the hashed list output buffer 28 from the record buffer 24 (step S26). If a record linked to the record moved into the hashed list output buffer 28 exists in the record buffer 24, the pointer indicating the record linked to the output record is stored in the entry corresponding to the present hash function value using the link control table 26. After that, whether or not the hashed list output buffer 28 is full is determined (step S27).

If the hashed list output buffer 28 is not full (NO, in step S27), the process goes to step S16 or step S19 in FIG. 9. If the hashed list output buffer 28 is full (YES, in step S27), after the output buffer output process of step S35, the process also goes to step S16 or step S19.

Figure 11:
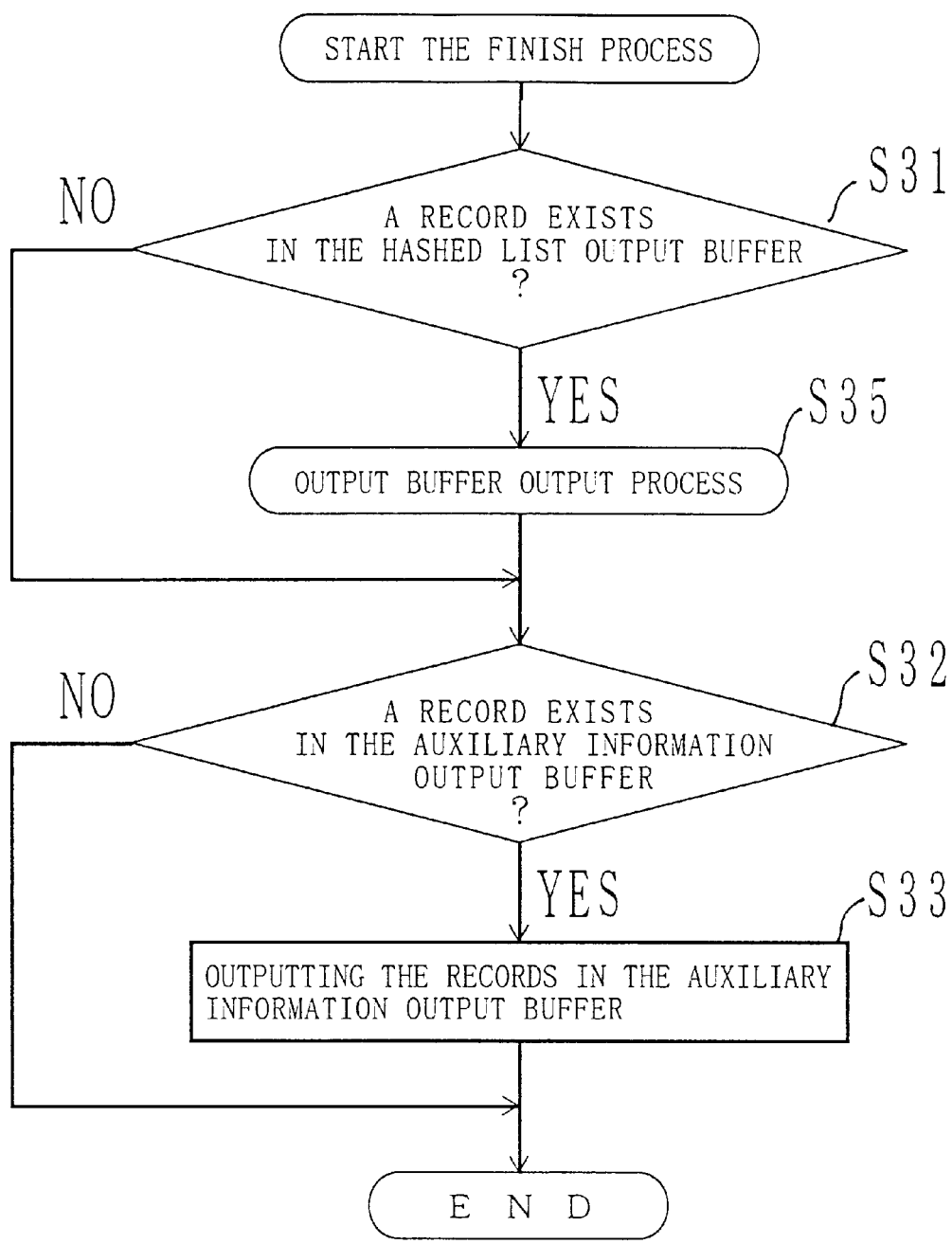
FIG. 11 is a flow chart showing a final process in the hash process according to the embodiment.

FIG. 11 shows the finish process of step S30 in FIG. 9. After starting the finish process, whether or not a record exists in the hashed list output buffer 28 is determined (step S31). If a record exists (YES, in step S31), the output record output process of step S35 is performed and all of the records in the hashed list output buffer 28 are output to the hashed list 31, then the process goes to step S32. If no records exists in the hashed list output buffer 28 (NO, in step S31), the process directly goes to step S32.

In step S32, whether or not the auxiliary information record is stored in the auxiliary information output buffer 29 is determined. If the auxiliary information record exists in the auxiliary information output buffer 29 (YES, in step S32), after outputting all of the auxiliary information records in the auxiliary information output buffer 29 to the auxiliary information list 32 (step S33), the hash process is completed. If no auxiliary information record exists in the auxiliary information output buffer 29 (NO, in step S32), the hash process is completed without performing the process of step S33.

Figure 12:
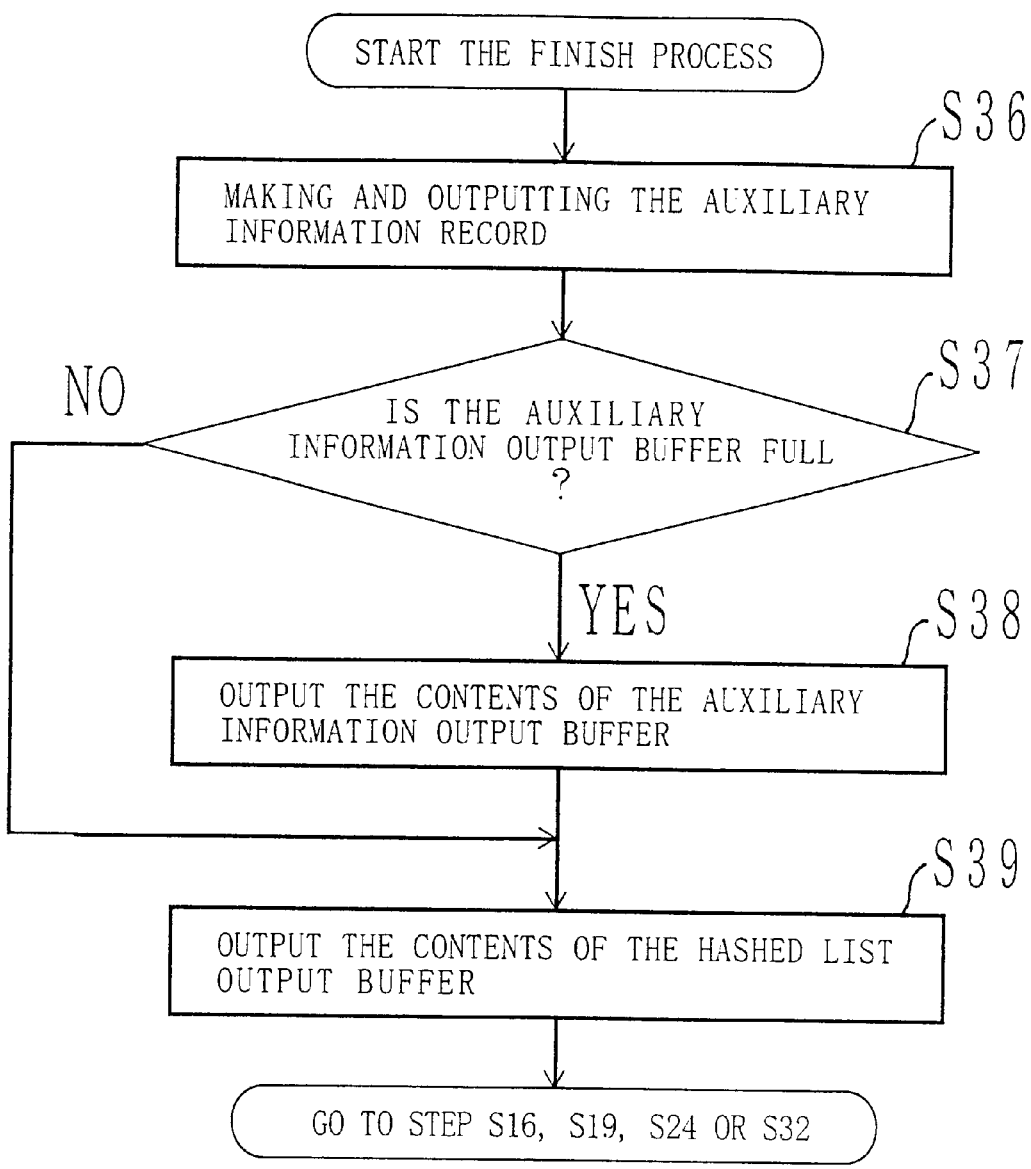
FIG. 12 is a flow chart showing an outputting process in the hash process according to the embodiment.

FIG. 12 shows the output buffer output process of step S35. After starting the output buffer output process, the auxiliary information record is made and stored in the auxiliary information output buffer 29 (step S36). The auxiliary information record includes the start address of a block in the hashed list 31 in which the records output from the hashed list output buffer 28 are stored, and the maximum value and the minimum value of the hash function values of the records in the block. The maximum value and the minimum value correspond to the hash function values of the first record and the last record in the block, respectively.

Next, whether or not the auxiliary information output buffer 29 is full is determined (step S37). If the auxiliary information output buffer 29 is full (YES, in step S37), all of the auxiliary information records in the auxiliary information output buffer 29 are output to the auxiliary information list 32 (step S38) and the process goes to step S39. If the auxiliary information output buffer 29 is not full (NO, in step S37), the process directly goes to step S39, in which the contents of the hashed list output buffer 28 are output to the hashed list 31. After the step S39, the process goes to one of the steps of steps S16 and S19 in FIG. 9, step S24 in FIG. 10, and step S32 in FIG. 11.

A specific example of the hash process according to the present invention will be described below. A record string shown in FIG. 13, which includes forty (40) records, is hashed in this hash process. Numerals in FIG. 13 indicate the key values which respectively correspond to the records in the record string unit.

In this hash process, for example, the hash function value is set to be the remainder of the division of the key value by twenty (20) using a hash function, the record-storing capacities of the record buffer 24 and the hashed list output buffer 28 are ten (10) and four (4), respectively, and the number of the entry of the hash table 25 is twenty (20).

Figure 14:
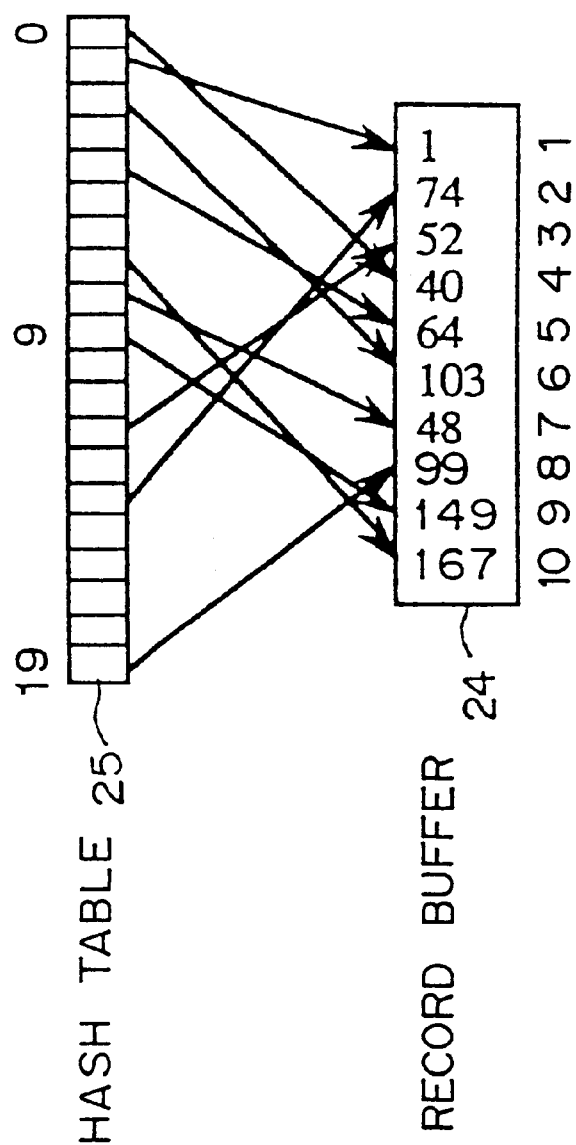
FIG. 14 shows a state in which the first ten records of the string of records have been stored in the record buffer.

FIG. 14 shows a state in which the first ten (10) records of the record string have been stored in the record buffer 24. For example, the hash function value of the second record having the key value of seventy-four (74) is fourteen (14), and the second record is indicated by the pointer stored in the fourteenth entry of the hash table 25. In FIG. 14, Each of the entries of the hash table 25 is given a number in ascending order from right to left. However, the entries may also be given numbers in order from left to right.

Since the record buffer 24 in FIG. 14 is already full of records, the fourth record having the key value of forty (40), which corresponds to the hash function value of zero (0), is output from the record buffer 24 to the hashed list output buffer 28 in the next step.

Figure 15:
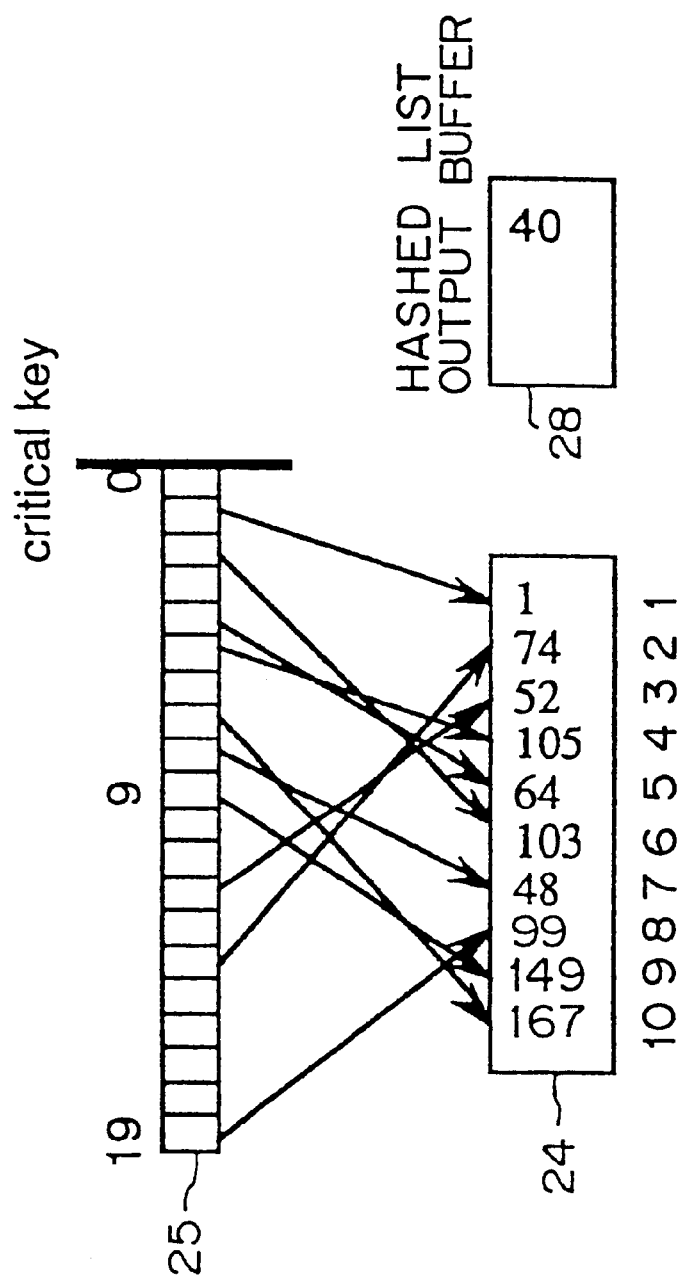
FIG. 15 shows a state in which one record has been moved to the output buffer.

FIG. 15 shows a state in which the fourth record has been output to the hashed list output buffer 28. In this state, the value of a critical key value, which indicates the hash function value and the position in the hash table 25 used for outputting the record, is zero (0). Then, the fourth record corresponding to the hash function value of zero (0) is stored in the hash list output buffer 28, and the eleventh record having the key value of 105 is stored in the fourth entry of the record buffer 24, instead of the fourth record.

FIG. 16 shows a state in which the next three records are stored in the hashed list output buffer 28, and the twelfth through fourteenth records in the record string are stored in the record buffer 24. In this state, the value of the critical key is three (3). Since the hashed list output buffer 28 is full, four records in the hashed list output buffer 28 are output to the hashed list 31 as a block, and the auxiliary information record for the block is prepared.

The auxiliary information record includes the auxiliary information of [0, 0, 3], as shown in FIG. 16. The first number of zero (0) in the auxiliary information indicates the block number, which corresponds to the address of the block in the secondary storage 16 in which the records in the block are stored. The second number of zero (0) and the third number of three (3) indicate the minimum value and the maximum value of the hash function values of the records in the corresponding block, respectively. Therefore, the auxiliary information indicates that the block is stored in the 0-th block of the secondary storage 16, and includes records corresponding to the hash function values of zero (0) to three (3). The second number and the third number will be referred to as "hash key start" and "hash key end" in the following descriptions.

Figure 17:
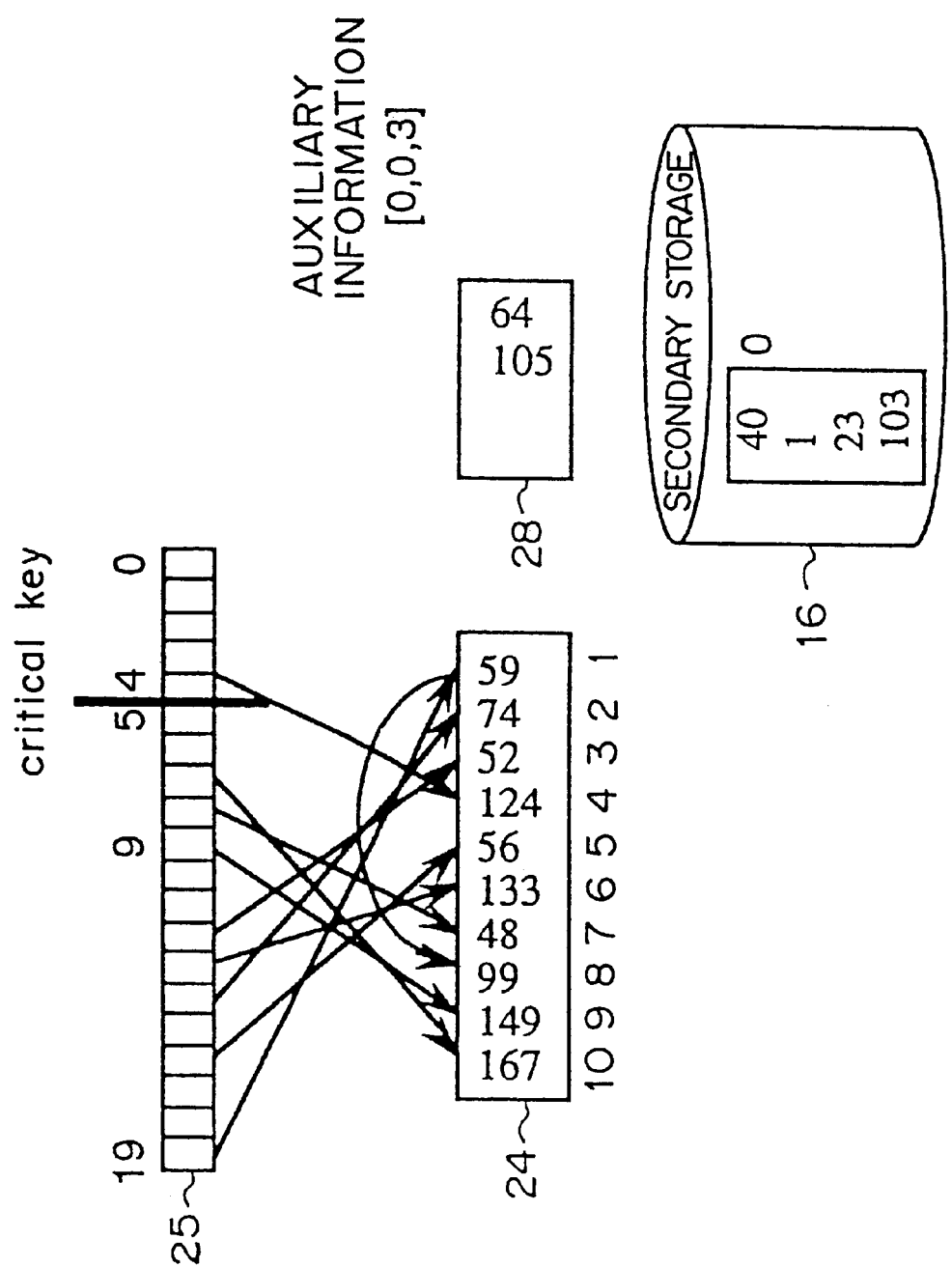
FIG. 17 shows the hash process according to the embodiment when the critical key value becomes 5.

FIG. 17 shows a state in which the value of the critical key is five (5). In this state, the block having the block number of zero (0) is already stored in the secondary storage 16. The record having the key value of one hundred twenty-four (124), which corresponds to the hash function value of four (4), is stored in the fourth entry of the record buffer 24. The hash function value of this record is smaller than the present value of the critical key. This shows that the record having the key value of one hundred twenty-four (124) is read into the record buffer 24 after the value of the critical key becomes five (5).

In the hash method, the record output from the record buffer 24 is selected from the records having a key value larger than the value of the critical key, so that the order of the records in the block according to the hash function value is maintained. The record having the key value of one hundred sixty-seven (167) is, therefore, selected as the record to be output.

Figure 18:
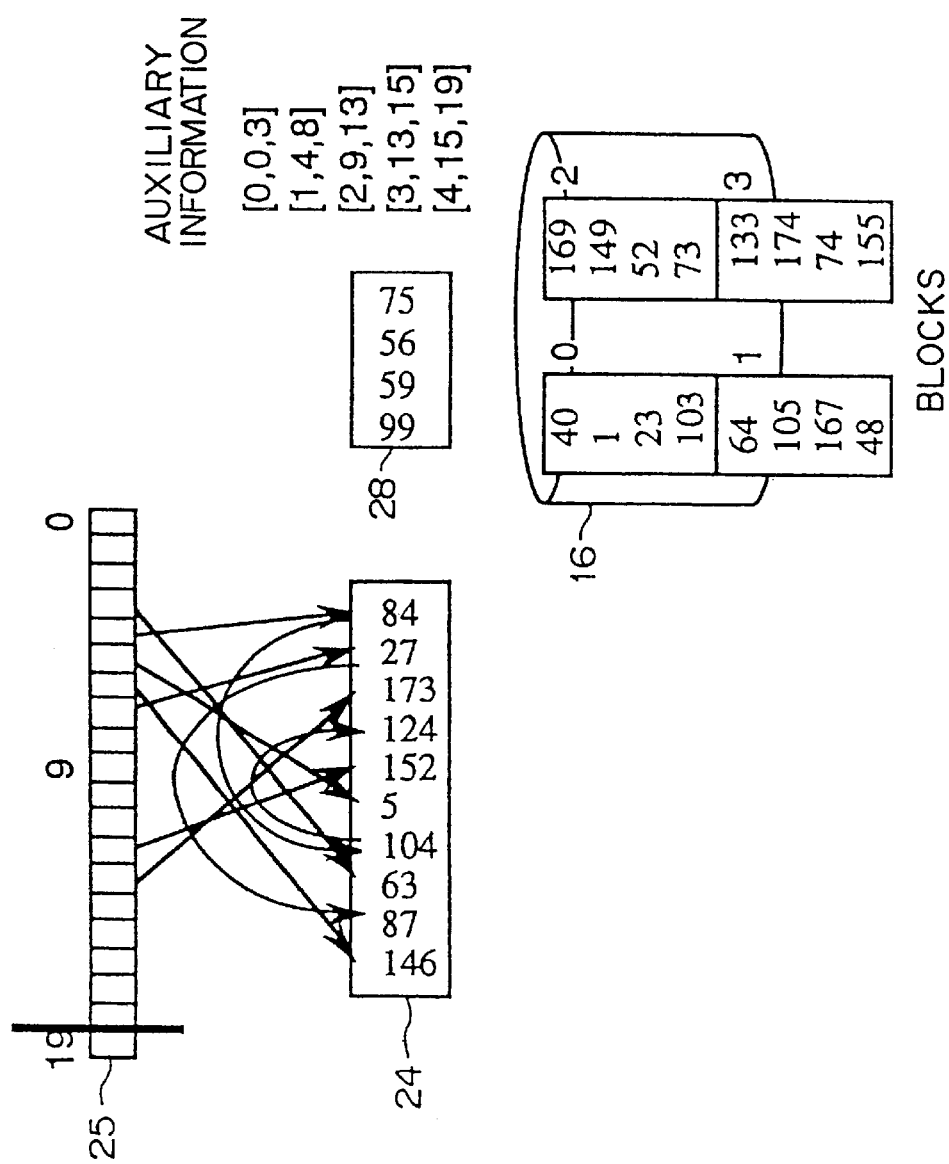
FIG. 18 shows the hash process according to the embodiment when the critical key value reaches a value indicating the end of the hash table.

FIG. 18 shows a state in which the critical key has come to the last entry of the hash table 25. Here, the value of the critical key is nineteen (19), which indicates the last value of the hash function value. Therefore, the value of the critical key returns to zero (0) to continue the output process.

Figure 19:
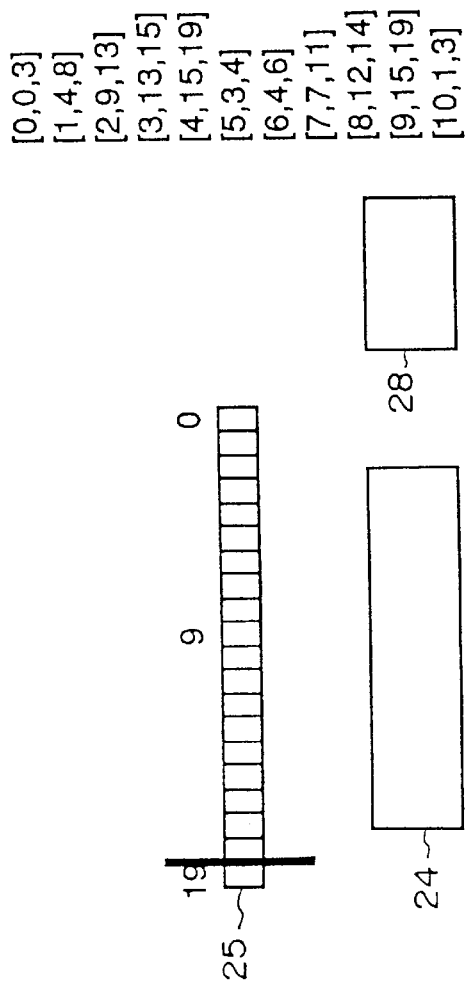
FIG. 19 shows a state in which the hash process has been finished.
Figure 19:
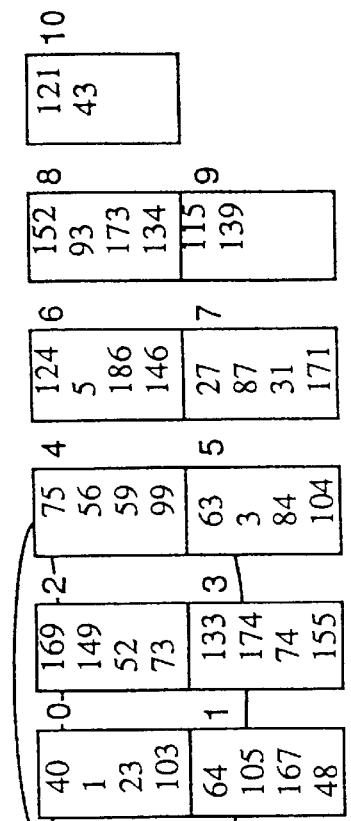

FIG. 19 shows a state in which the hash process has been completed. The value of the critical key increased from zero (0) to nineteen (19) three times in the hash process. The blocks numbered zero (0) through four (4) were output at the first time, the blocks numbered five (5) through nine (9) were output at the second time, and the block numbered ten (10) was output at the third time of the increase in the value of the critical key.

A record retrieval process, in which the record having a designated hash function value is retrieved from the hashed list 31 based on the auxiliary information, will be described below. FIG. 20 shows the auxiliary information prepared in the above described process. The designated hash function value will be referred to as the hash key in the following description.

When the record having a hash function value of three (3) is retrieved, the block corresponding to the auxiliary information having the hash key start which is equal to or smaller than three (3), and having the hash key end which is equal to or larger than three (3) is retrieved. If the block is found in the hashed list 31, all of the records in the block are read out from the hashed list 31 to obtain the record having the hash function value of three (3). According to the auxiliary information shown in FIG. 20, the blocks numbered zero (0), five (5), and ten (10) include records having the hash function value of three (3).

Figure 21:
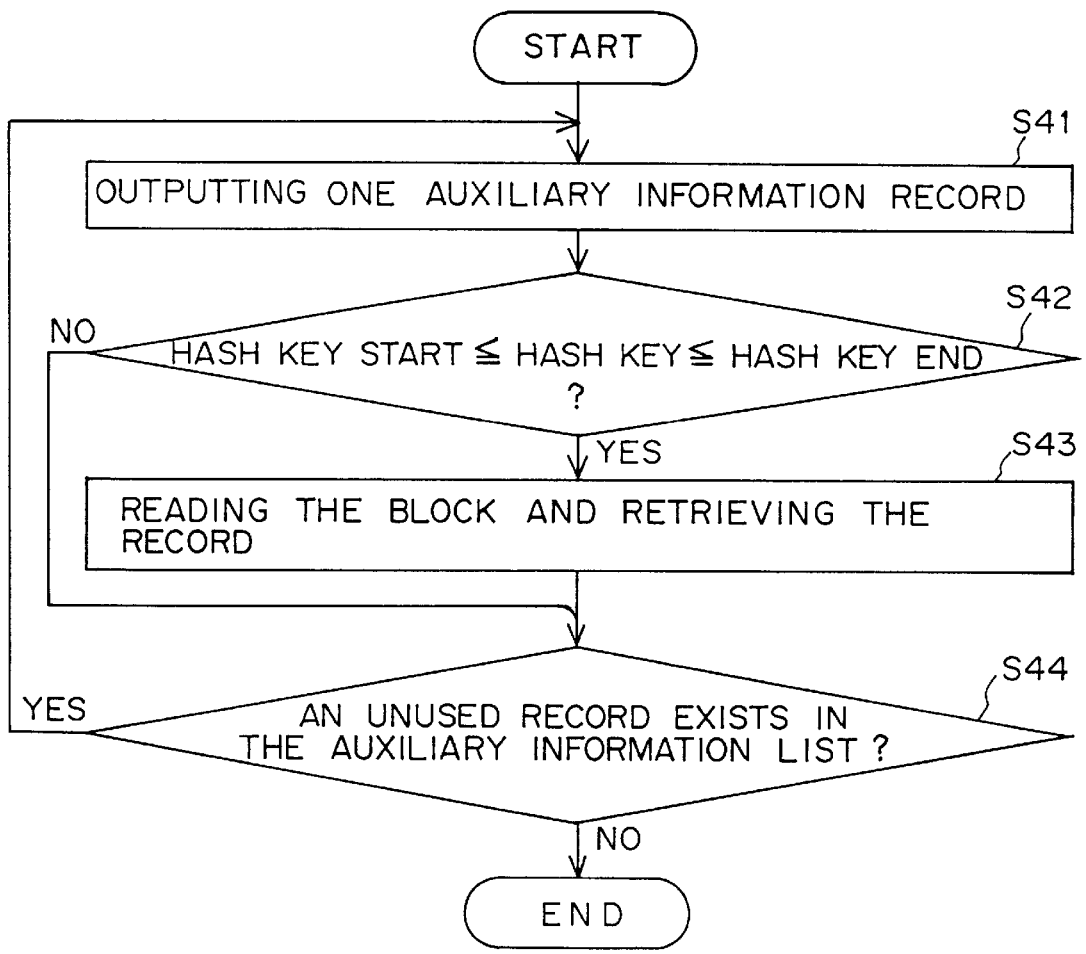
FIG. 21 is a flow chart showing a record retrieval process using the auxiliary information.

FIG. 21 is a flow chart showing the record retrieval process. As shown in FIG. 21, after starting the record retrieval process, one auxiliary information record is output from the auxiliary information list 32 (step S41). Then, whether or not the hash key is equal to or larger than the hash key start of the auxiliary information record, and equal to or smaller than the hash key end of the auxiliary information record, is determined (step S42). If the hash key satisfies this requirement (YES, in step S42), the block corresponding to the auxiliary information record is read and the record in the block is retrieved (step S43), and then the process goes to step S44.

If the hash key does not satisfy this requirement (NO, in step S42), the process goes to step S44, in which whether or not an unused auxiliary information record is stored in the auxiliary information list 32 is determined. If an unused auxiliary information record is still stored (YES, in step S44), the process goes back to step S41. If an unused auxiliary information record is not stored (NO, in step S44), the process is completed.

According to the above described record retrieval process, all of the auxiliary information records in the auxiliary information list 32 are used for the retrieval. Therefore, when a large number of the auxiliary information records is stored in the auxiliary information list 32, it takes a long time to complete the record retrieval process.

In order to solve this problem, another record retrieval process may be used. In this record retrieval process, the auxiliary information records in the auxiliary information list 32 are classified according to the hash function value between the hash key start and the hash key end of the auxiliary information records by a range classification table.

Figure 22:
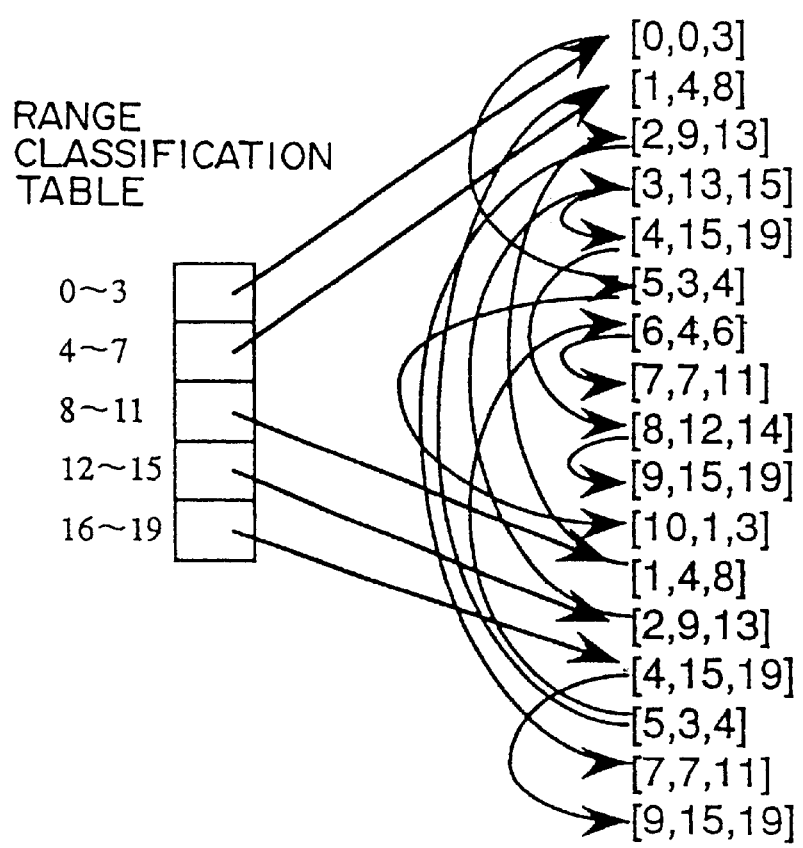
FIG. 22 shows auxiliary information lists classified according to the auxiliary information.

FIG. 22 shows the auxiliary information list 32 so classified. When the block including the record having the hash function value of three (3), for example, three auxiliary information records of [0, 0, 3], [5, 3, 4], and [10, 1, 3] are selected by the range classification table, then the corresponding three blocks are retrieved. According to the record retrieval process, the auxiliary information records used for the retrieval are limited, thereby shortening the retrieval time.

Figure 23:
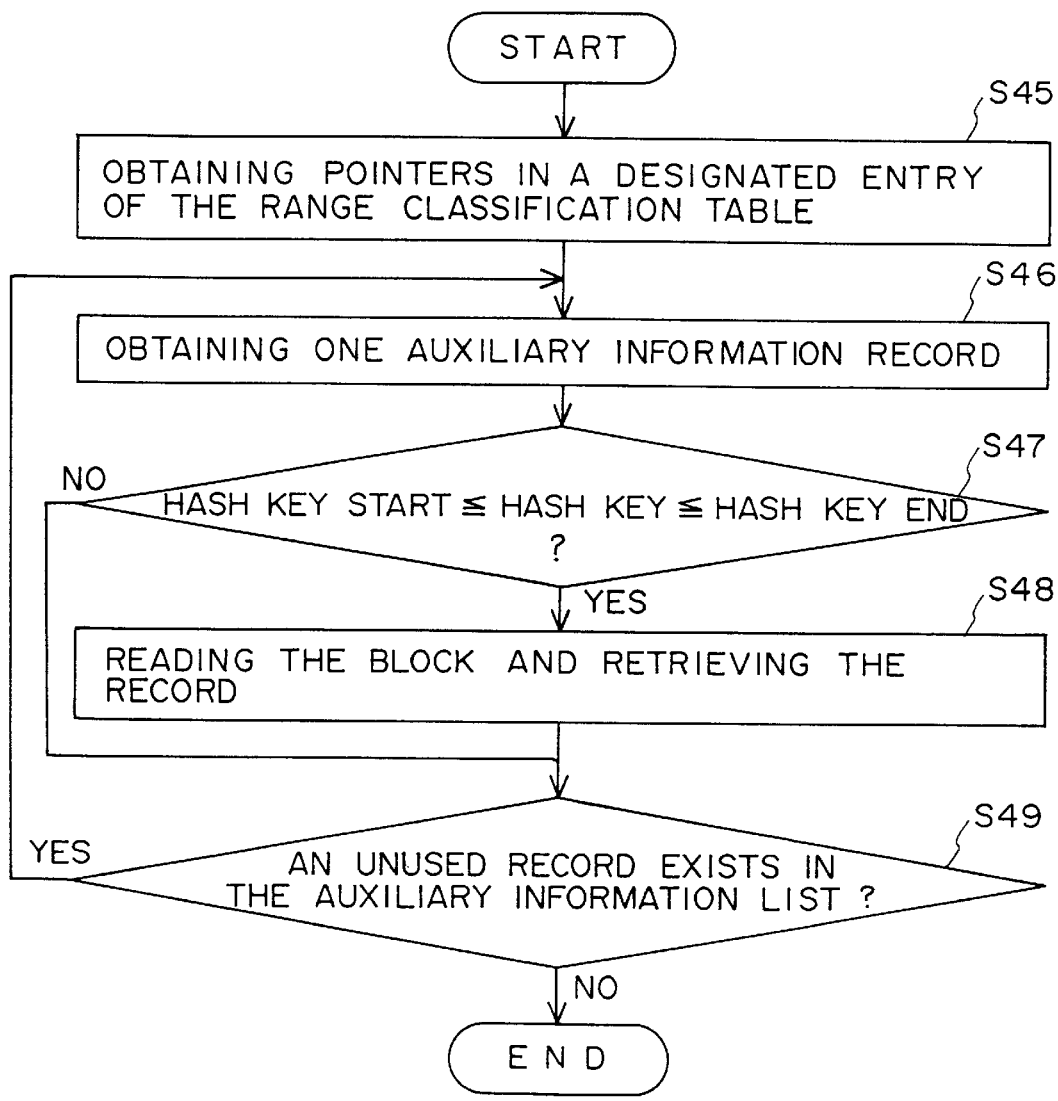
FIG. 23 is a flow chart showing the record searching process using the classified auxiliary information.

FIG. 23 is a flow chart showing the above described record retrieval process. As shown in FIG. 23, after starting the process, pointers in a entry of the range classification table designated by the hash key are obtained (step S45). Next, one of the auxiliary information records indicated by the pointers is obtained from the auxiliary information list 32 (step S46). Then, whether or not the hash key is equal to or larger than the hash start key, and is equal to or smaller than the hash key end of the obtained auxiliary information record, is determined (step S47).

If the hash key satisfies this requirement (YES, in step S47), the block corresponding to the auxiliary information record is read and the records in the block are retrieved (S48), and then, the process goes to step S49. If the hash key does not satisfy the requirement (NO, in step S47), the process goes to step S49, in which whether or not an indicated unused auxiliary information record is stored in the auxiliary information list 32, is determined. If an unused auxiliary information record is still stored (YES, in step S49), the process goes back to step S46. If an unused auxiliary information record is not stored (NO, in step S49), the process is completed.

In the hash process shown in FIG. 14 through FIG. 19, every time a record is moved to the hashed list output buffer 28 from the record buffer 24 a new record is input to the empty area in the record buffer 24 from the input buffer 23. However, a plurality of records may be input to the record buffer 24 to fill all the entries of the record buffer 24 at one time, after the record buffer 23 output all of the records stored therein.

This hash process will be described below. The same record string shown in FIG. 13 and the same hash function are used in the description of this hash process, and the capacities of the record buffer 24 and the hashed list output buffer 28 are ten (10) and four (4), respectively.

Figure 24:
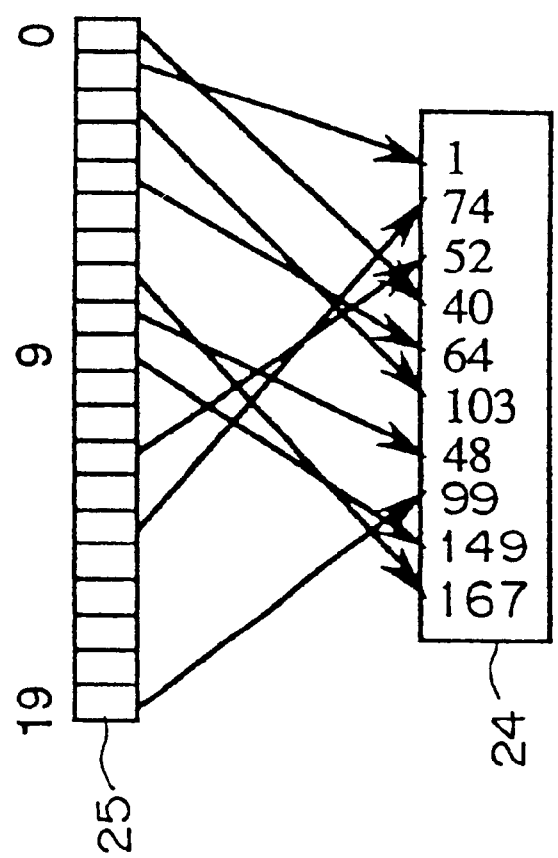
FIG. 24 shows a state in which the first ten records of the input records have been stored in the record buffer.
Figure 25:
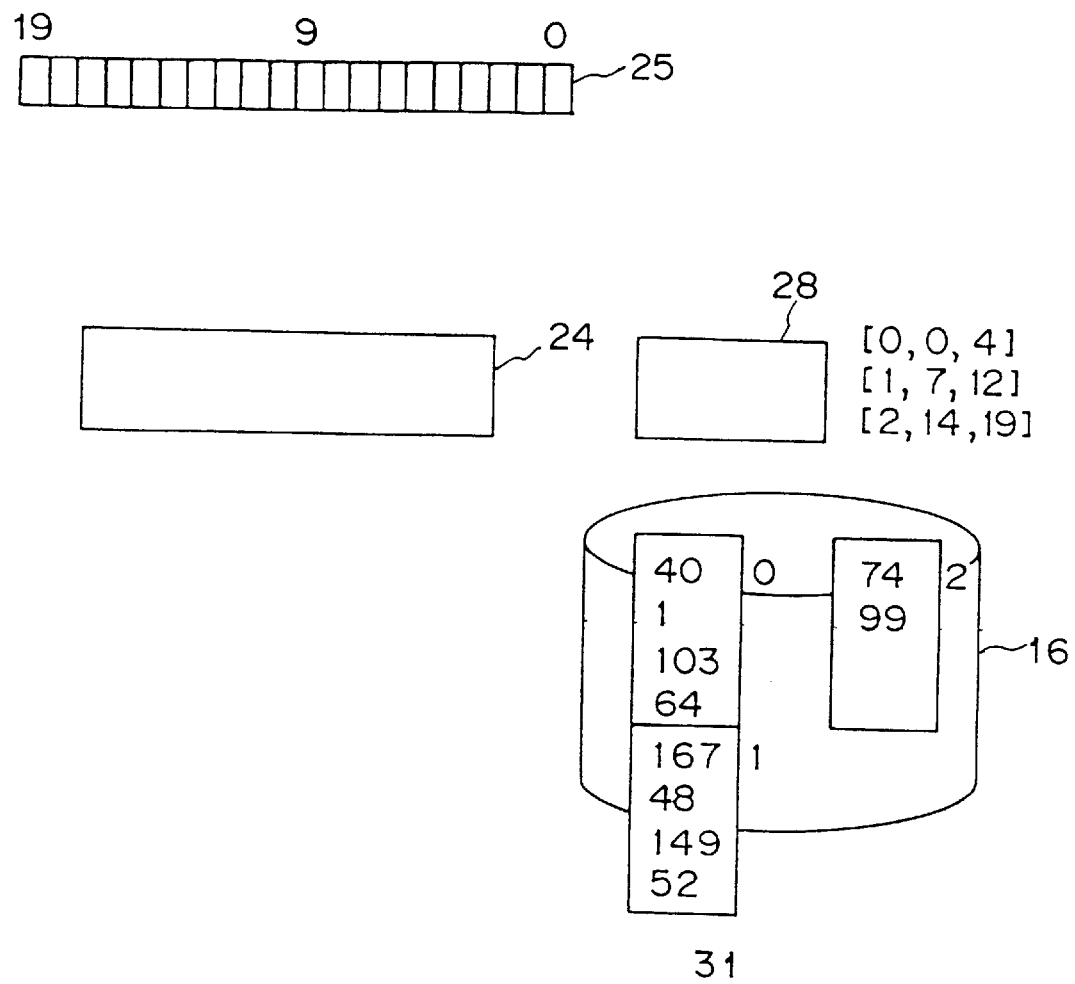
FIG. 25 shows a state in which all of the records in the record buffer have been output to a hashed list.

FIG. 24 shows a state in which the first ten (10) records of the record string are stored in the record buffer 24, and FIG. 25 shows a state in which all of the records stored in the record buffer 24 have been output to the hashed list 31 through the hashed list output buffer 28. In the state shown in FIG. 25, there is no record in the record buffer 24 and three blocks corresponding to auxiliary information records of [0, 0, 4], [1, 7, 12], and [2, 14, 19] have been prepared in the hashed list 31. The third block numbered two (2) includes only two records because the record buffer 24 does not receive any records until the third block is completed.

Figure 26:
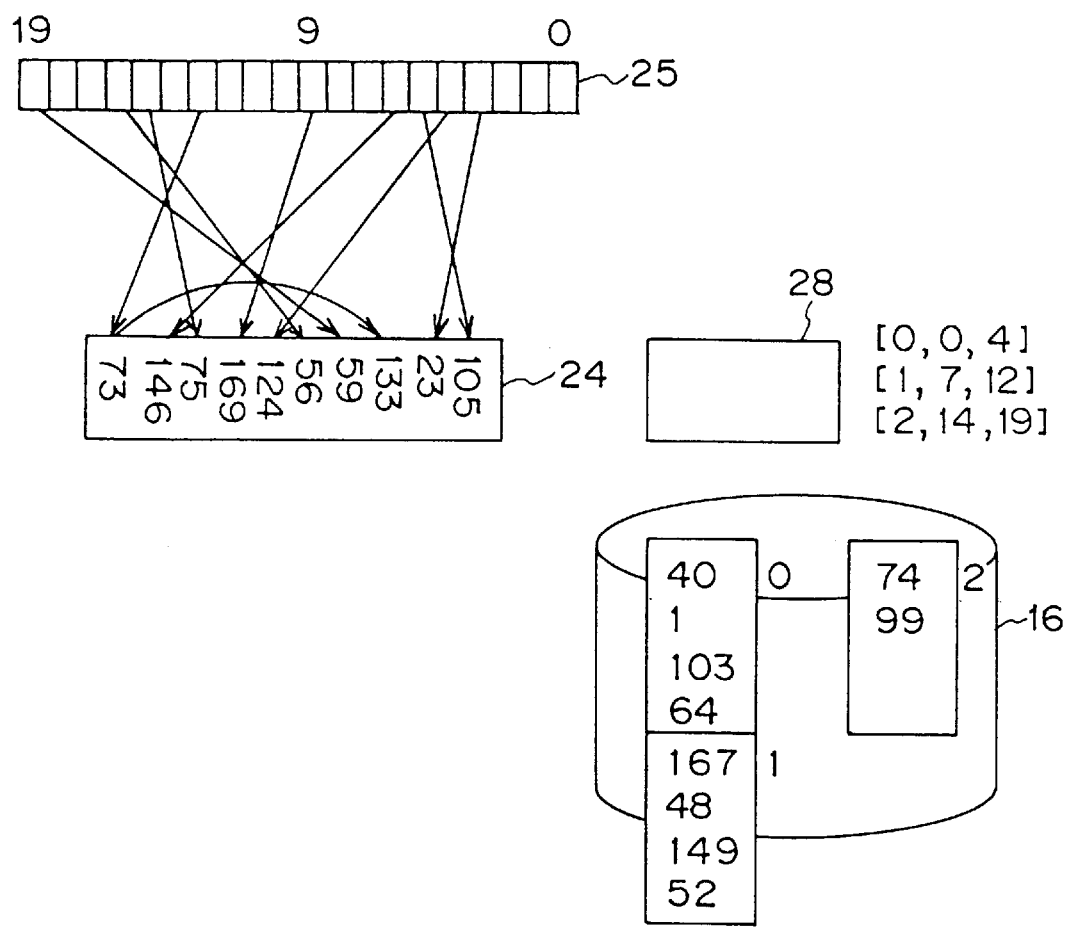
FIG. 26 shows a state in which the next ten records have been stored in the record buffer.
Figure 27:
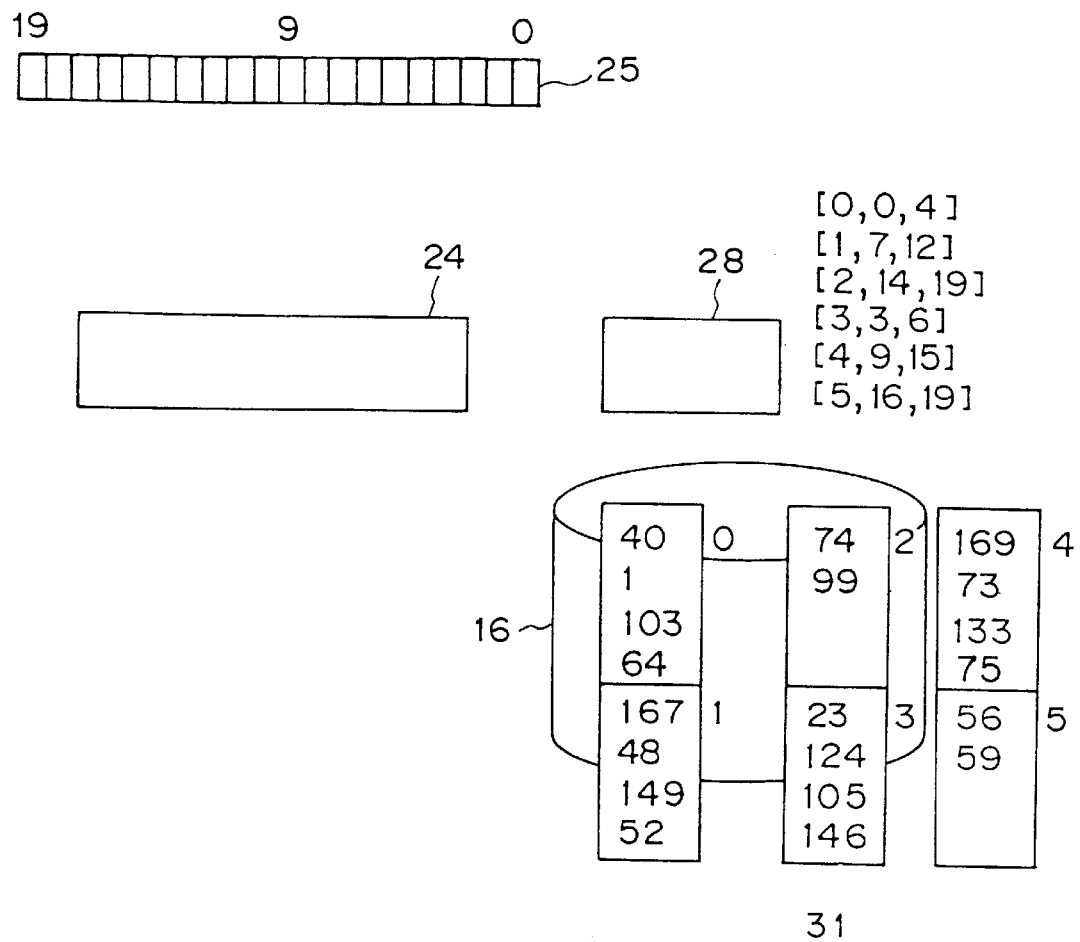
FIG. 27 shows a state in which the next ten records have been output to the hashed list.

FIG. 26 shows a state in which the next ten (10) records have been stored in the record buffer 24, and FIG. 27 shows a state in which all of the records stored in the record buffer 24 have been output to the hashed list 31. As shown in FIG. 27, three blocks numbered three (3), four (4), and five (5) are newly prepared. The block numbered five (5) also includes only two records and each of the contents of these three blocks is different from those shown in FIG. 19.

Figure 28:
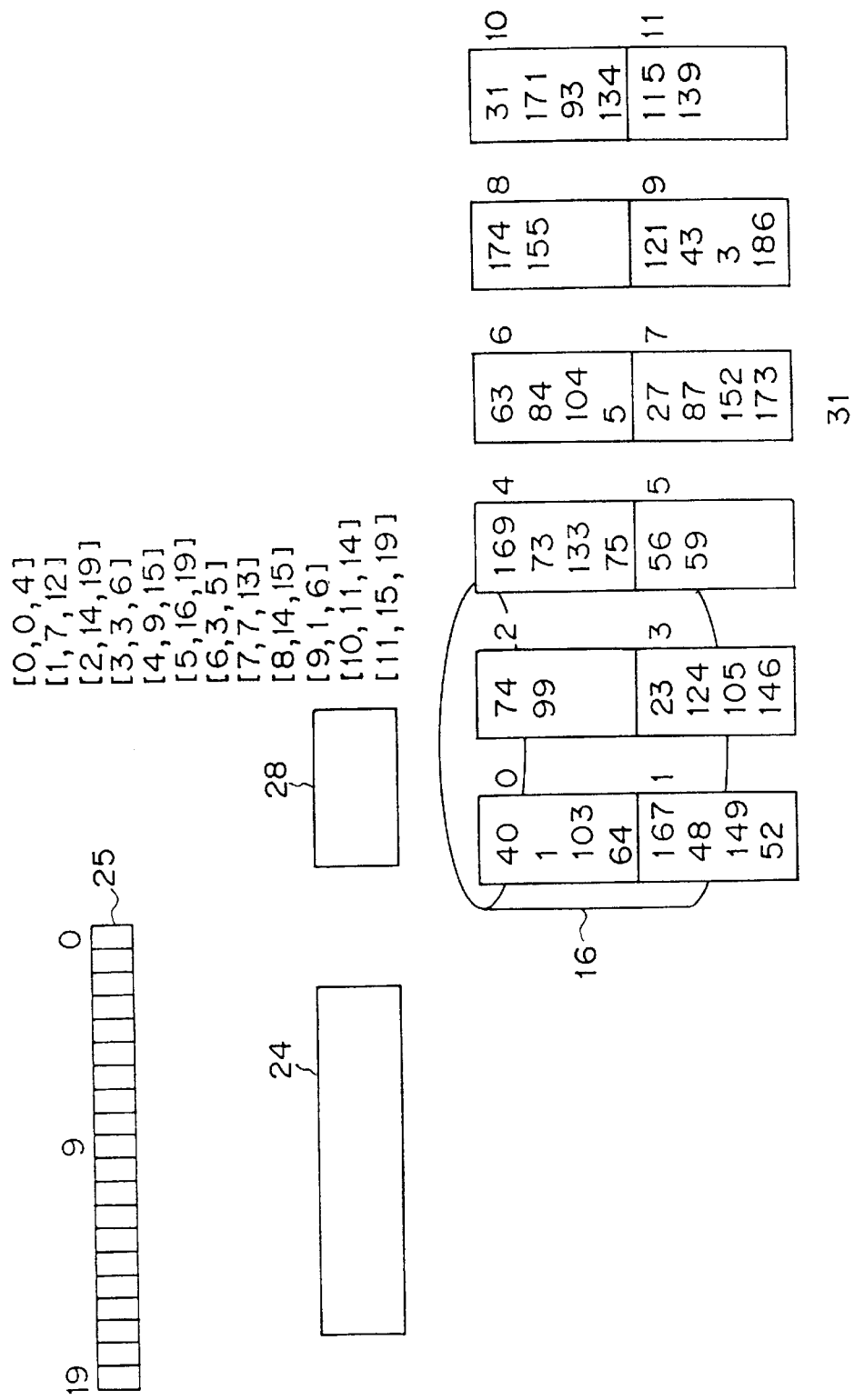
FIG. 28 shows the result of the hash process according to the embodiment.

FIG. 28 shows a result of the hash process in which forty (40) records have been hashed. The number of the resulting blocks is eleven (11) and the blocks numbered two (2), five (5), eight (8), and eleven (11) include empty regions.

According to the invention, since the records hashed are stored in one hashed list, input-output performance of the secondary storage is improved thereby attaining a high-speed hash process.

What is claimed is:

1. A hash method for transforming a record list stored on a secondary storage unit to a hash record list storable on the secondary storage unit along with an association list, comprising:

reading a group of records from the record list of the secondary storage unit into a record buffer;

creating a hash table having M entries, where M is a number of hash values of a hash function;

forming an indexing structure so that the value of an entry of the hash table points to all the records of the record buffer having the number of that entry;

creating a critical key value designating one of the hash function values;

moving records in the record buffer into an output buffer containing records having similar hash values by selecting according to the critical key value the next record of the record buffer to output to a block in the output buffer;

outputting the block of records to the secondary storage unit when the output buffer is full; and outputting an association block to the association list in the secondary storage unit indicating the block number and minimum and maximum value within the block.

2. A hash method for transforming a group of records to be hashed stored in a storage unit into a referenceable storage form using hash function values, which respectively correspond to key values of the records, comprising;

storing in a temporary storage a first group of the records to be hashed;

storing pointers, each of which indicates a storing position in the storage unit for a record stored in the temporary storage unit, each pointer associated with a hash function value obtained by a calculation based on a key value of the record; and outputting to the storage unit a second group of the records, the second group selected as including all of the pointers for the records in the temporary storage corresponding to at least one designated hash function value.

3. A hash method according to claim 2, wherein records stored in the temporary storage and having the same hash function value are linked to each other in forming the second group, and wherein one of pointers indicating storing positions of the records linked to each other is used in storing the second group.

4. A hash method according to claim 2, further comprising storing auxiliary information used for retrieving the records in the second group as a block from the storage unit according to the hash function value.

5. A hash method according to claim 4, further comprising:

sequentially storing the records in the block into a hashed list in the storage unit, and storing the auxiliary information into an auxiliary information list in the storage unit.

6. A hash method according to claim 5, wherein the auxiliary information includes an address of the block in the hashed list, and the maximum value and the minimum value of the hash function values corresponding to the records in the block.

7. A hash method according to claim 2, wherein a record output from the storage unit is temporarily stored in an input record storing area and then output to a record storing area.

8. A hash method according to claim 7, wherein one of the records in the input record storing area is output to an available region in the record storing area resulting from output of another record from the record storing area.

9. A hash method according to claim 7, wherein if record storing regions of the record storing area are all empty, all of the records stored in the input record storing area are output to the record storing area.

10. A hash method according to claim 2, wherein if record storing regions of the record storing area are filled with the records, the records are sequentially output from the record storing area.

11. A hash system comprising;

a storage unit to store records before and after hashing;

a record storing unit to store a first group of the records received from said storage;

a pointer storing unit to store pointers, each of which indicates a storing position of a corresponding record stored in said record storing unit, in association with a hash function value obtained by a calculation based on a key value of the corresponding record; and an output unit to receive a second group of records indicated by corresponding pointers selected as having at least one designated hash function value, from said record storing unit and to output the second group of records to said storage unit.

12. A hash system for transforming a group of records to be hashed stored in a storage unit into a referenceable storage form using hash function values calculated based on key values of the records, comprising:

a record storing unit to temporarily store a first group of the records;

a pointer storing unit to store pointers, each of which indicates a storing position of a corresponding record stored in said record storing unit, in association with a hash function value obtained by a calculation based on a key value of the corresponding record; and an output unit to receive a second group of the records indicated by corresponding pointers stored in said pointer storing unit and selected as corresponding to at least one designated hash function value, from said record storing unit, and to output the second group of records as a block to the storage unit.

13. A hash system according to claim 1, further comprising a link control unit to link records stored in the record storing unit and having the same hash function value, and wherein said pointer storing unit stores one of the pointers indicating storing positions of the records linked by said link control unit.

14. A hash system according to claim 1, further comprising an auxiliary information storing unit to store auxiliary information used for retrieving the records in the block according to the hash function value.

15. A hash system according to claim 14, wherein the output unit sequentially stores the records in the block in a hashed list in the storage unit, and wherein the auxiliary information output from the auxiliary information storing unit is stored in an auxiliary information list in the storage unit.

16. A hash system according to claim 15, wherein the auxiliary information includes an address of the block in the hashed list, and the maximum value and the minimum value of the hash function values corresponding to the records in the block.

17. A hash system according to claim 1, further comprising an output hash value storing unit to designate the hash function value corresponding to the record output from said record storing unit.

18. A hash system according to claim 1, further comprising an input record storing unit to store records output from the storage unit and to output the records to said record storing unit.

19. A hash system according to claim 18, wherein said input record storing unit outputs a record into an available region resulting from an output of a record from said record storing unit.

20. A hash system according to claim 18, wherein if record storing regions of said record storing unit are all empty, all of the records stored in said input record storing unit are output to said record storing unit.

21. A hash system according to claim 1, wherein if record storing regions of said record storing unit are filled with records, said record storing unit sequentially outputs records.

* * * * *